United States Patent
Gayaka et al.

(10) Patent No.: US 11,927,963 B2
(45) Date of Patent: Mar. 12, 2024

(54) SYSTEM TO DETERMINE NON-STATIONARY OBJECTS IN A PHYSICAL SPACE

(71) Applicant: AMAZON TECHNOLOGIES, INC., Seattle, WA (US)

(72) Inventors: Shreekant Gayaka, San Jose, CA (US); Boshen Niu, San Mateo, CA (US); Simon Edwards-Parton, Palo Alto, CA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 419 days.

(21) Appl. No.: 17/207,039

(22) Filed: Mar. 19, 2021

(65) Prior Publication Data
US 2022/0300001 A1      Sep. 22, 2022

(51) Int. Cl.
*G06F 17/10*      (2006.01)
*G01C 21/20*      (2006.01)
(Continued)

(52) U.S. Cl.
CPC ......... *G05D 1/0214* (2013.01); *G01C 21/206* (2013.01); *G05D 1/0088* (2013.01);
(Continued)

(58) Field of Classification Search
CPC .. G05D 1/0214; G05D 1/0088; G05D 1/0238; G06T 7/74; G06T 7/248;
(Continued)

(56) References Cited

U.S. PATENT DOCUMENTS

2016/0188977 A1   6/2016  Kearns et al.
2021/0019536 A1   1/2021  Motoyama
(Continued)

FOREIGN PATENT DOCUMENTS

| EP | 2571660 A2 | 3/2013 |
| EP | 2952993 A1 | 12/2015 |
| WO | 2018199958 A1 | 11/2018 |

OTHER PUBLICATIONS

"Hungarian algorithm", Wikipedia.com, 4 pages. Retrieved on Feb. 12, 2021 from URL: https://en.wikipedia.org/wiki/Hungarian_algorithm.
(Continued)

*Primary Examiner* — Adam M Alharbi
(74) *Attorney, Agent, or Firm* — Lindauer Law, PLLC

(57) ABSTRACT

A physical space contains stationary objects that do not move over time (e.g., a couch) and may have non-stationary objects that do move over time (e.g., people and pets). An autonomous mobile device (AMD) determines and uses an occupancy map of stationary objects to find a route from one point to another in a physical space. Non-stationary objects are detected and prevented from being incorrectly added to the occupancy map. Point cloud data is processed to determine first candidate objects. Image data is processed to determine second candidate objects. These candidate objects are associated with each other and their characteristics assessed to determine if the candidate objects are stationary or non-stationary. The occupancy map is updated with stationary obstacles. During navigation, the occupancy map may be used for route planning while the non-stationary objects are used for local avoidance.

20 Claims, 10 Drawing Sheets

(51) Int. Cl.
  *G05D 1/00* (2006.01)
  *G06T 7/246* (2017.01)
  *G06T 7/60* (2017.01)
  *G06T 7/73* (2017.01)
  *G06V 20/56* (2022.01)
  *G10L 15/08* (2006.01)
  *G10L 15/22* (2006.01)
  *H04R 1/32* (2006.01)
  *H04R 3/00* (2006.01)

(52) U.S. Cl.
  CPC ............ *G05D 1/0238* (2013.01); *G06T 7/248* (2017.01); *G06T 7/60* (2013.01); *G06T 7/74* (2017.01); *G06V 20/56* (2022.01); *G10L 15/08* (2013.01); *G10L 15/22* (2013.01); *H04R 1/326* (2013.01); *H04R 3/005* (2013.01); *G06T 2207/10028* (2013.01); *G06T 2207/30241* (2013.01); *G06T 2207/30252* (2013.01); *G10L 2015/088* (2013.01)

(58) Field of Classification Search
  CPC ............. G06T 7/60; G06T 2207/10028; G06T 2207/30241; G06T 2207/30252; G06V 20/56; G01C 21/206; G10L 15/08; G10L 15/22; G10L 2015/088; H04R 1/326; H04R 3/005
  See application file for complete search history.

(56) References Cited

U.S. PATENT DOCUMENTS

2021/0026355 A1* 1/2021 Chen ..................... G06F 18/22
2022/0185267 A1* 6/2022 Beller ............... B60W 60/0015
2022/0408180 A1* 12/2022 Lepoutre ................... G01S 5/22

OTHER PUBLICATIONS

Jonker, R., et al., "A Shortest Augmenting Path Algorithm for Dense and Sparse Linear Assignment Problems", Computing 38, pp. 325-340, 1987, Springer-Verlag.

Vassilev, Tzvetalin, S., et al., "Algorithms for Matching in Graphs", Algorithms Research 2012, 1(4), pp. 20-30, DOI: 10.5923/J.algorithms.20120104.02. Published online at http://journal.sapub.org/algorithms, Scientific & Academic Publishing 2012.

Rawat, Pallav, "Environment Perception for Autonomous Driving : A1/10 Scale Implementation of Low Level Sensor Fusion Using Occupancy Grid Mapping", Mar. 1, 2019, 67 pages, Retrieved from the Internet: URL:http://www.diva-portal.org/smash/get/diva2:1304683/FULLTEXT01.pdf.

Schwarzenberger, T., "Patent Cooperation Treaty International Search Report and Written Opinion dated Apr. 14, 2022", Patent Cooperation Treaty Application No. PCT/US22/70737, Patent Cooperation Treaty, Apr. 14, 2022.

Wittman-Regis, Agnes, "International Preliminary Report on Patentability and Written Opinion dated Sep. 28, 2023", Patent Cooperation Treaty Application No. PCT/US22/70737, Patent Cooperation Treaty, Sep. 28, 2023.

* cited by examiner

SYSTEM TO DETERMINE NON-STATIONARY OBJECTS IN A PHYSICAL SPACE

BACKGROUND

An autonomous mobile device (AMD) moves throughout a physical space. To facilitate this movement, the AMD gathers information about the physical space to determine a map to use for navigation.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features. The figures are not necessarily drawn to scale, and in some figures, the proportions or other aspects may be exaggerated to facilitate comprehension of particular aspects.

Figure 1:
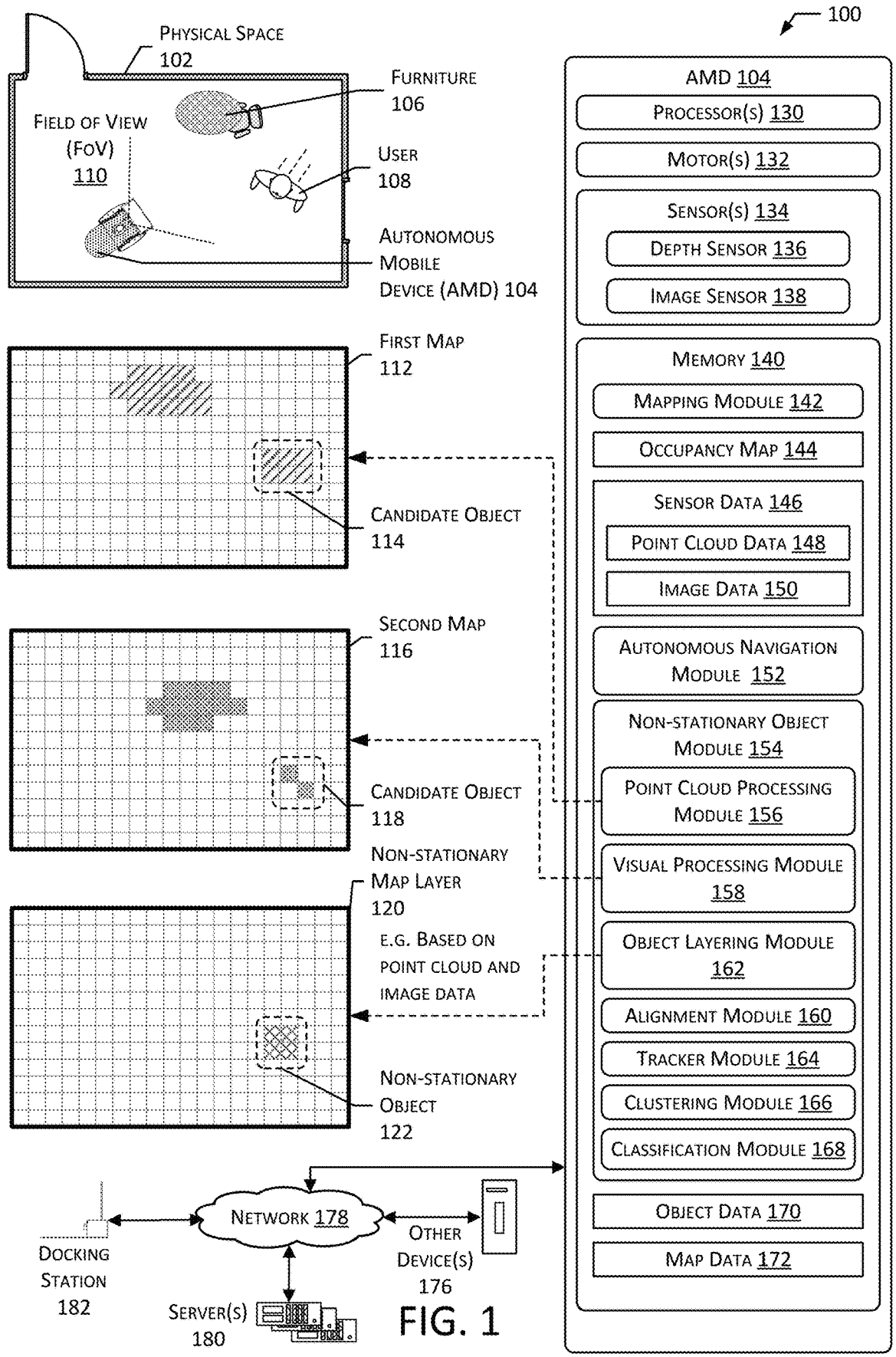
FIG. 1 illustrates a system for moving through a physical space with an autonomous mobile device (AMD) and using sensor data to determine non-stationary objects, according to some implementations.

While implementations are described herein by way of example, those skilled in the art will recognize that the implementations are not limited to the examples or figures described. It should be understood that the figures and detailed description thereto are not intended to limit implementations to the particular form disclosed but, on the contrary, the intention is to cover all modifications, equivalents, and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean "including, but not limited to".

DETAILED DESCRIPTION

An autonomous mobile device (AMD) such as a robot is capable of autonomous movement that allows the AMD to move between locations in a physical space without being driven or controlled by a user. During autonomous movement, the AMD determines whether an object in the physical space is a stationary object or a non-stationary object. Using the determinations of which objects in a physical space are stationary objects or non-stationary objects, the AMD determines an occupancy map of the stationary objects that does not include non-stationary objects. The AMD uses the occupancy map to determine a path plan between locations in the physical space. An occupancy map that includes non-stationary objects would become cluttered, showing obstacles that do not actually exist, and interfere with the ability to plan a path for the AMD to move autonomously.

Traditional approaches to building a map of a physical space may not accurately distinguish between stationary objects and moving objects. Such traditional approaches may misclassify moving objects as stationary objects, resulting in a map that fails to include path plans through a location of a misclassified stationary object. Over time, successive misclassifications of moving objects may result in an incorrect occupancy map of a physical space that depicts objects that are not present. While path planning, the more obstacles there are, the more difficult it is to plan a path. As a result, a cluttered occupancy map may slow down or completely prevent autonomous movement. A "map" is used for providing an accessible visual, however, a map may be implemented using any data structure that provides for storage and modification of data. For example, data indicated by a map may be managed by arrays, database records, lists, data objects, graphs, and so forth.

Described in this disclosure are techniques for determining those objects that are non-stationary objects, allowing those non-stationary objects to be excluded from an occupancy map that may be used for path planning or other purposes. Sensor data is acquired and analyzed to determine various characteristics of objects in a physical space. Based on these characteristics, an object may be classified as a stationary object or a non-stationary object. The stationary objects may be used to update the occupancy map, while the non-stationary objects are not. As the AMD moves along a path, the AMD may use information about non-stationary objects to make navigation decisions that avoid interfering with the non-stationary objects. This allows the AMD to avoid collisions or interfering with the movement of the non-stationary objects.

To improve computational efficiency, prior to the AMD classifying an object as non-stationary or stationary, the AMD may use characteristics about the object to filter out or reduce the objects being considered. For example, the AMD may use the sensor data over time to determine one or more characteristics about an object, including a length, a width, an aspect ratio, velocity, and so forth. Using the one or more characteristics, the AMD may filter out some objects due to being associated with objects that are not expected to move, such as furniture, walls, or plants. By filtering out some objects prior to a classification process, the AMD avoids expending computational resources classifying objects with a low probability of being classified as dynamic.

The multiple sensors may include a depth sensor and an image sensor. A depth sensor may be used to acquire point cloud data. An individual point in the point cloud data is a three-dimensional coordinate representative of a location where the depth sensor detected a portion of an object in the physical space. The point cloud data may be used to determine locations and dimensions of objects in the physical space. The point cloud data determined by a depth sensor is indicative of whether an obstacle is present or not, and also includes information about the distance between the sensor and the object and relative direction with respect to the sensor and an object, if detected. An image sensor may be used to acquire image data representative of the physical space, where the image data may be used to determine locations and characteristics of objects in the physical space. The AMD may use sensor data from both the depth sensor and image sensor to increase a confidence level that an object within the physical space is being accurately characterized as a stationary or non-stationary object. In situations where sensor data is unavailable, such as when the field of view (FOV) of the image sensor is directed elsewhere, the point cloud data may be used classify the object.

Using an occupancy map that takes into consideration non-stationary objects allows the AMD to more efficiently perform tasks that involve moving within the physical space. These tasks may include patrolling the physical space, interacting with users, transporting cargo, and so forth. For example, the AMD may perform sentry tasks involving moving through rooms in the physical space.

The AMD may use a non-stationary object module to determine whether sensor data is representative of a non-stationary object. In some examples, image data from an image sensor, without use of depth sensor data, may be used to determine a non-stationary object. In other examples, point cloud data from a depth sensor, without use of image data, may be used to determine a non-stationary object. In other examples, both image data and point cloud data may be used to determine a non-stationary object.

The non-stationary object module may determine that an object is a stationary object based on the object not moving or moving at a velocity that does not interfere with the AMD navigating the physical space. The AMD may determine that an object is a non-stationary object based on the object moving faster than a first threshold velocity. For example, over the course of a time period, the AMD may determine that an object is non-stationary based on the object moving at a first velocity that is greater than the first threshold velocity. Over the course of the time period, if the object slows down below a second threshold velocity, the object may be determined to no longer be dynamic.

The non-stationary object module may include a clustering module to determine whether depth sensor data is representative of a candidate object that may be determined to be dynamic. The clustering module may filter out detected objects as candidate objects based on determining whether the one or more cells are arranged in a shape or size associated with an object expected to move. The clustering module may determine that an object is a candidate object based on the candidate object having an aspect ratio that is less than a threshold aspect ratio value. For example, a sofa may have a length of P centimeters, a width of Q centimeters, and an aspect ratio of P:Q. The sofa may be filtered out as a candidate object based on having an aspect ratio that is greater than or equal to a threshold aspect ratio value. Similarly, walls or other large objects may be filtered out as candidate objects. In some examples, an aspect ratio of the one or more cells may be used to filter out a candidate object based on the aspect ratio being greater than or equal to a threshold aspect ratio value. For example, if a candidate object has an aspect ratio of cells that is greater than or equal to X:Y, then the candidate object may be filtered out as a candidate. A single cell or multiple cells may be associated with a location. For example, sensor data may be used to determine one or more objects within a physical area, and an individual object at a given location may be indicated by one or more cells that are associated with the given location.

The non-stationary object module may include a visual processing module that uses feature detection algorithms to identify one or more objects within the physical space. For example, a facial recognition algorithm may determine that a user is present within the physical space. The visual processing module may also determine a relative location of the user within the physical space. The visual processing module may use this information to determine a candidate object.

The non-stationary object module may include a classification module that uses one or more characteristics of candidate objects to determine whether the candidate object is a non-stationary object or a stationary object. The one or more characteristics may include one or more of: alignment of a candidate object from the clustering module with a candidate object from the visual processing module, velocity of the candidate object, a change in velocity over time, a size of the candidate object, an aspect ratio of the candidate object, and so forth. Candidate objects determined to be stationary objects are added to the occupancy map. Candidate objects determined to be non-stationary objects are not added to the occupancy map. Instead, characteristics about the non-stationary objects are saved and referenced as the AMD moves through the physical space.

By using the systems and techniques described in this disclosure, the AMD is able to reliably navigate through a physical space using an accurate occupancy map that is kept free of non-stationary objects. Because the occupancy map is kept free of non-stationary objects, the occupancy map does not eliminate possible path plans through the physical space because of the inclusion of non-stationary objects within the occupancy map. Information about the non-stationary objects is used to adjust a path plan to avoid interfering within people or pets or other moving entities within the physical space.

Illustrative System

FIG. 1 illustrates a system 100 for moving through a physical space 102 with an AMD 104 and using sensor data to determine non-stationary objects, according to some implementations.

The AMD 104 is shown in a physical space 102 that includes a user 108 and furniture 106. The AMD 104 may include one or more processors 130, one or more motors 132, sensors 134, and memory 140. The one or more sensors 134 may have different fields of view (FoV), including an example FoV 110. For example, a depth sensor 136 may have a first field of view and an image sensor 138 may have a second field of view. A FoV 110 is the extent of the physical space 102 represented by sensor data 146 acquired using one or more sensors 134. The AMD 104 may be configured to dock or connect to a docking station 182. The docking station 182 may provide external power which the AMD 104 may use to charge a battery of the AMD 104.

As the AMD 104 moves through the physical space 102, a mapping module 142 may use sensor data 146 to determine an occupancy map 144 of the physical space 102. Sensor data 146 may include point cloud data 148 and image data 150. The occupancy map 144 may represent dimensions of the physical space 102 and stationary objects within the physical space 102. For example, the occupancy map 144 may comprise data that indicates the location of one or more stationary objects. A non-stationary map layer may be used to determine locations and characteristics of one or more non-stationary objects. In some implementations, the occupancy map 144 may comprise a plurality of cells with each cell of the plurality of cells representing a particular area in the physical space 102. Data, such as occupancy values, may be stored that indicates whether an area of the physical space 102 associated with the cell is unobserved, occupied by an object, or is unoccupied. An object may comprise a physical obstacle or feature that prevents or impairs traversal by the AMD 104. For example, an object may comprise a wall, stairwell, and so forth. In this disclosure, a "map" is used for providing an accessible visual, however, a map may be implemented using any data structure that provides for storage and modification of data. For example, data indicated by a map may be managed by one or more arrays, one or more database records, one or more lists, one or more data objects, one or more graphs, and so forth.

An autonomous navigation module 152 provides the AMD 104 with the ability to navigate within the physical space 102 without real-time human interaction. The autonomous navigation module 152 may implement, or operate in conjunction with, the mapping module 142 to determine the occupancy map 144. The autonomous navigation module 152 may generate path plan data that is indicative of a path through the physical space 102 from the current location to a destination location. The AMD 104 may then begin moving along the path.

The AMD 104 may include the depth sensors 136 that may determine depth data about the presence or absence of objects in the physical space 102, and so forth. For example, the depth sensors 136 may comprise a time-of-flight (TOF) depth camera, ultrasound, radar, LIDAR, stereocamera, and so forth. The depth data is indicative of whether an object is detected or not, and also includes information about the distance between the depth sensor 136 and the object and relative direction with respect to the depth sensor 136 of an object, if detected. The depth data may comprise point cloud data 148. An individual point in the point cloud data 148 is a three-dimensional coordinate representative of a location where the depth sensor 136 detected a portion of an object in the physical space 102. Point cloud data 148 may comprise a plurality of coordinate points indicative of one or more objects within the physical space 102. Each individual coordinate point of the plurality of coordinate points may indicate an individual three-dimensional coordinate. The point cloud data 148 may be used to determine locations and dimensions of objects in the physical space 102. The point cloud data 148 determined by a depth sensor is indicative of whether a physical object is present or not, and also includes information about the distance between the sensor and the object and relative direction with respect to the sensor and an object, if detected.

The image sensor 138 may acquire image data 150. For example, the image sensor 138 may comprise a monovision camera, stereovision camera, or other imaging device. The image data 150 is representative of at least a portion of the physical space 102. The image data 150 may be used to determine locations and characteristics of objects in the physical space 102.

The AMD 104 may use a non-stationary object module 154 to determine whether sensor data 146 is representative of a non-stationary object. The non-stationary object module 154 classifies an object detected within the physical space as stationary or non-stationary. The AMD 104 may determine that an object is a stationary object based on the object not moving or moving at a velocity that is less than or equal to a threshold value. The AMD 104 may determine that an object is a non-stationary object based on the object moving faster than a first threshold velocity. For example, over the course of a time period, the AMD 104 may determine that an object is non-stationary based on the object moving at a first velocity that is greater than the first threshold velocity. Over the course of the time period, if the object slows down below a second threshold velocity, the object may be determined to not be dynamic. Stationary object data and non-stationary object data may be stored within object data 170.

The AMD 104 may update the occupancy map 144 to include stationary objects that are not already included or that may have been relocated. For example, a physical space 102 may include objects that at a first time may have been determined to be stationary, such as furniture 106. At the first time, the first occupancy map 144 may accurately represent a size and location of the furniture 106. However, at a second time, if a chair is introduced to the physical space 102, then the first occupancy map 144 becomes inaccurate. As the AMD 104 moves through the physical space 102 and determines presence of an object representative of the chair, the AMD 104 determines that the object is a stationary object. The AMD 104 may also determine a location and dimensions of the stationary object and determine a second occupancy map 144 that includes a representation of the stationary object—the chair.

The non-stationary object module 154 may include modules that are used to process sensor data 146 to determine candidate objects for classification, to determine whether to classify candidate objects as non-stationary objects, and to maintain accuracy of an occupancy map 144 to represent stationary objects and not non-stationary objects. As depicted in FIG. 1, the non-stationary object module 154 includes a point cloud processing module 156, a visual processing module 158, an alignment module 160, an object layering module 162, a tracker module 164, a clustering module 166, and a classification module 168. In some examples, image data 150 from an image sensor 138, without use of depth sensor data such as point cloud data 148, may be used to determine a non-stationary object. In other examples, point cloud data 148 from a depth sensor 136, without use of image data 150, may be used to determine a non-stationary object. In other examples, both image data 150 and point cloud data 148 may be used to determine a non-stationary object.

The point cloud processing module 156 may acquire point cloud data 148 determined by the depth sensor 136. The point cloud processing module 156 may use the three-dimensional point cloud data 148 to determine a two-dimensional occupancy map 144 of the physical space 102. The two-dimensional occupancy map 144 may include representations of one or more of: walls, furniture, non-stationary objects, and so forth. The two-dimensional occupancy map 144 may be represented by a grid of cells, where an individual cell may be representative of physical dimensions of the physical space 102, such as M x N centimeters. An individual cell may be considered "occupied" if sensor data 146 indicates that at least a portion of a physical object is located at a portion of the physical space 102 associated with the cell.

The clustering module 166 receives the two-dimensional occupancy map 144 determined by the point cloud processing module 156. The clustering module 166 may use the two-dimensional occupancy map 144 to determine whether one or more occupied cells are representative of a candidate object 114 that may be determined to be dynamic. The clustering module 166 may filter out detected objects as candidate objects based on determining whether the one or more cells are arranged in a shape or size associated with an object expected to move. The clustering module 166 may determine that an object is a candidate object based on the candidate object having an aspect ratio that is less than a threshold aspect ratio value. For example, a sofa may have a length of P centimeters, a width of Q centimeters, and an aspect ratio of P:Q. The sofa may be filtered out as a candidate object based on having an aspect ratio that is greater than or equal to a threshold aspect ratio value. Using a similar basis, walls or other large objects may be filtered out as candidate objects. An object may also be filtered out based on a height value. Point cloud data 148 may include coordinate points for a cluster that may be used to determine a height value for an object. Relative to the AMD 104, a height value may indicate a distance above a plane associated with a floor of the physical space. A height value may be one of the one or more characteristics associated with an object. For example, if an object is below a first height or above a second height, the object may be filtered out. The first height may be a height below which the AMD 104 may move over, such as the height of a magazine lying flat on a floor. The second height may be a height above which the AMD 104 may not collide with if the AMD 104 moved beneath the object, such as a hanging plant. Continuing with this example, the candidate object 114 determined by the clustering module 166 is depicted within a first map 112. The first map 112 may be stored within map data 172. The candidate objects determined by the clustering module 166 may then be used by the tracker module 164 to determine whether the candidate objects are objects that are tracked.

The tracker module 164 receives the candidate object data determined by the clustering module 166. The tracker module 164 may determine whether a candidate object is an object that is tracked. An object that is tracked may be assessed by the classification module 168 to determine whether the object that is tracked is a non-stationary object or a stationary object. In some implementations, the tracker module 164 may be bypassed or eliminated, and a candidate object determined by the clustering module 166 may be used by the classification module 168 to determine whether a candidate object is a non-stationary object or a stationary object. In this example, the tracker module 164 may determine whether a candidate object is an object that is tracked based on one or more of: a physical location, a velocity, size (e.g., bounding radius), an association between a particular candidate object and a previously tracked candidate object. The tracker module 164 may improve the likelihood that a candidate object determined by the clustering module 166 is determined to be a non-stationary object because the tracker module 164 may determine whether the candidate object has characteristics that indicate the candidate object is moving as a non-stationary object would move.

For example, at a first time, the tracker module 164 may receive first candidate object data determined by the clustering module 166. The first candidate object data may indicate a first size and first location within the physical space 102. At a second time, the tracker module 164 may receive second candidate object data determined by the clustering module 166. The second candidate object data may indicate a second size and a second location within the physical space 102. The tracker module 164 may determine that the second candidate object data is representative of the first candidate object in a second location based on the second size being equal or equivalent to the first size and on an estimated velocity of the second candidate object being within threshold values of a non-stationary object.

In some examples, the tracker module 164 may receive object data that is associated with a first cluster of point cloud data that is associated with a first set of coordinates indicating a first location within the physical space 102. To determine whether the first cluster may be an object to be tracked, the tracker module 164 may determine whether an object that was previously tracked may be expected to be at the first location based on a path and velocity of the object that was previously tracked. For example, the object that was previously tracked may have last been updated at a first time, and the first cluster may have been determined at a second time. A second location that indicates a projected location of the object that was previously tracked within the physical space at the second time. The second location may be determined based on a difference between the first time and the second time, and based on a location, a direction, and a velocity associated with the object that was previously tracked.

The threshold values may include a first threshold velocity indicative of a slow-walking velocity and a second threshold velocity indicative of a fast-walking velocity. The tracker module 164 may determine a data association between the first candidate object data and the second candidate object data using a linear assignment algorithm, such as the Konig-Egervary Hungarian data association algorithm or a LAPJV (Jonker-Volgenant Algorithm for a Linear Assignment Problem) algorithm. The tracker module 164, based on the association between the first candidate object data and the second candidate object data may determine that the first candidate object data and the second candidate object data are indicative of an object that is tracked as represented by tracking data. The tracking data may then be used by the classification module 168 to determine whether the object that is tracked is a non-stationary object or a stationary object.

The visual processing module 158 may use image data 150 to determine candidate objects. For example, the visual processing module 158 may use feature detection algorithms to identify one or more objects within the physical space 102. For example, a facial recognition algorithm may determine that a user 108 is present within the physical space 102. Similarly, the visual processing module 158 may determine whether the image data 150 is representative of a pet, another living being, or another autonomous mobile device. The visual processing module 158 may also determine a confidence value associated with first data. In one example, the confidence value may be indicative of a likelihood that the object indicated by the first data is a non-stationary object or the object is capable of movement, such as a pet, a human, or another autonomous mobile device. In another example, the confidence value may be indicative of a likelihood that the first data is correct. For example, if the confidence value is greater than a first threshold, then an object may be determined to be a candidate object 118. The visual processing module 158 may also determine a relative location of the candidate object 118 within the physical space 102. In this example, the candidate object 118 determined by the visual processing module 158 is depicted within a second map 116. The second map 116 may be stored within map data 172. In some implementations, the candidate objects 118 determined by the visual processing module 158 may then be used by the classification module 168 to determine whether the candidate object 118 is a non-stationary object. In other implementations, the candidate objects 118 determined by the visual processing module 158 may be used by an alignment module 160 to determine whether the candidate object 118 is aligned with objects that are tracked.

The alignment module 160 may use candidate objects 118 determined by the visual processing module 158 and either objects that are tracked determined by the tracker module 164 or candidate objects 118 determined by the clustering module 168. A first object may be a candidate object 118 determined by the visual processing module 158. A second object may be an object that is tracked determined by the tracker module 164 or may be a candidate object 118 determined by the clustering module 166. The alignment module 160 may determine that a first location of the first object is less than or equal to a threshold distance from a second location of the second object. The first location may be associated with a first set of coordinates relative to the physical space 102, and the second location may be associated with a second set of coordinates relative to the physical space 102. In this example, the alignment module 160 may base a determination that the first object and the second object are indicative of a same object based on the first location of first object being less than or equal to the threshold distance from the second location of the second object. The alignment module 160 may also determine that a first size of the first object is within a threshold percentage of a second size of the second object.

The alignment module 160 may determine that the first object is aligned with the second object based on the first location of the first object being less than or equal to the threshold distance from the second location of the second object and on the first size of the first object being within a threshold percentage of the second size of the second object. The alignment module 160 may determine an aligned object based on both the first object and on the second object. For example, the alignment module 160 may determine one or more characteristics of the aligned object based on one or more of: an average of a first width of the first object and a second width of the second object, an average of a first length of the first object and a second length of the second object, a velocity of the second object, or an average of corresponding coordinate values indicating a location of the first object and the second object within the physical space 102.

The classification module 168 may determine whether a particular object is a non-stationary object or a stationary object. A particular object may be an aligned object, an object that is tracked, or a candidate object. An aligned object is determined by the alignment module 160. An object that is tracked may be determined by the tracker module 164. A candidate object may be determined by either the visual processing module 158 or the clustering module 166. The classification module 168 may use one or more characteristics of aligned objects, candidate objects, or objects that are tracked to determine whether the particular object is a non-stationary object or a stationary object. The one or more characteristics may include one or more of: velocity of the particular object, a change in velocity over time, a size of the particular object, an aspect ratio of the particular object, and so forth. Particular objects determined to be stationary objects are added to a first layer of the occupancy map 144. Particular objects determined to be non-stationary objects are added to a second layer of the occupancy map 144. The non-stationary objects and stationary objects determined by the classification module 168 may be used by the object layering module 162 to update one or more layers of the occupancy map 144.

The object layering module 162 may use the stationary objects and the non-stationary objects to update the occupancy map 144. The occupancy map 144 may include a first layer indicative of stationary objects and a second layer indicative of non-stationary objects. The first layer of the occupancy map 144 may indicate locations, size, and other characteristics of a stationary object. The first layer of the occupancy map 144 may be used for route planning and determining paths between locations in the physical space 102. The second layer of the occupancy map 144 may indicate locations, size, velocity, and other characteristics of a non-stationary object 122. The second layer of the occupancy map 144 may be used for local navigation determinations to avoid collisions or interrupting movement of non-stationary objects 122 as the AMD 104 moves along a path plan. For example, the AMD 104 may determine a navigation path based on the path plan and use characteristics indicated by non-stationary object data associated with a non-stationary object to avoid an intersection, or collision, with the non-stationary object. The second layer is depicted as a non-stationary map layer 120. Because non-stationary objects in the second layer do not exclude path plans available in the first layer, the AMD 104 is able to determine path plans using an accurate representation of the stationary objects in the physical space 102.

One or more objects may be present within the physical space 102. For example, objects may comprise walls, furnishings, stair wells, people, and so forth. While moving from one location to another, the AMD 104 may determine where it is at a given time, determine the location of an object, and move while avoiding collisions with any objects. A command to move may be the result of input from a user 108, a previously scheduled task, a response to input from one or more sensors 134, a command from an external computing device, or another source.

The AMD 104 may move through the physical space 102. The motion of the AMD 104 may be described as a trajectory. In some implementations the trajectory may comprise a series of poses. Each pose may be indicative of a particular location with respect to a plurality of orthogonal axes and rotation with respect to individual ones of the axes. For example, the pose may comprise six-dimensional (6D) information indicative of coordinates in three-dimensional space with respect to a designated origin, and rotation with respect to each of the three axes.

One or more motors 132 or other actuators enable the AMD 104 to move from one location in the physical space 102 to another. For example, a motor 132 may be used to drive a wheel attached to a chassis of the AMD 104, which causes the AMD 104 to move. The AMD 104 may turn, move forward, move backward, and so forth. In another example, actuators may move legs allowing the AMD 104 to walk.

The AMD 104 may include one or more hardware processors 130 (processors) configured to execute one or more stored instructions. The processors 130 may comprise one or more cores. The processors 130 may include microcontrollers, systems on a chip, field programmable gate arrays, digital signal processors, graphic processing units, general processing units, and so forth.

A mapping module 142 determines a representation of the physical space 102 that includes the stationary objects and their locations in the physical space 102. During operation, the mapping module 142 uses the sensor data 146 from various sensors 134 to determine information such as where the AMD 104 is, how far the AMD 104 has moved, the presence of stationary objects, the presence of non-stationary objects, characteristics of the stationary objects and non-stationary objects, and so forth.

The mapping module 142 uses a simultaneous localization and mapping (SLAM) module. Localization is determining where the AMD 104 is in the physical space 102 and may utilize some external reference. For example, cameras may acquire images. These images are processed to determine the presence of features in the images, such as edges of doors, shadows on the wall, texture on the walls, and so forth.

A descriptor is information that describes a particular feature or set of features. Various techniques such as a scale-invariant feature transform (SIFT), speeded up robust features (SURF), a trained convolutional neural network, and so forth may be used to characterize the features and generate the descriptors. For example, the descriptor may comprise data indicative of the feature with respect to 256 different dimensions.

Modules described herein, such as the mapping module 142, may provide various processing functions such as de-noising, filtering, and so forth. Processing of sensor data 146, such as image data 150 from a camera, may be performed by a module implementing, at least in part, one or more of the following tools or techniques. In one implementation, processing of image data 150 may be performed, at least in part, using one or more tools available in the OpenCV library as developed by Intel Corporation of Santa Clara, California, USA; Willow Garage of Menlo Park, California, USA; and Itseez of Nizhny Novgorod, Russia. In another implementation, functions available in the OKAO machine vision library as promulgated by Omron Corporation of Kyoto, Japan, may be used to process the sensor data 146. In still another implementation, functions such as those in the Machine Vision Toolbox (MVTB) available using MATLAB as developed by MathWorks, Inc. of Natick, Massachusetts, USA, may be utilized.

Techniques such as artificial neural networks (ANNs), convolutional neural networks (CNNs), deep CNNs (DCNNs), active appearance models (AAMs), active shape models (ASMs), principal component analysis (PCA), cascade classifiers, and so forth, may also be used to process the sensor data 146 or other data. For example, the ANN may be trained using a supervised learning algorithm such that object identifiers are associated with images of particular objects within training images provided to the ANN. Once trained, the ANN may be provided with the sensor data 146 and produce output indicative of the object identifier.

An autonomous navigation module 152 provides the AMD 104 with the ability to navigate within the physical space 102 without real-time human interaction. The autonomous navigation module 152 may implement, or operate in conjunction with, the mapping module 142 to determine one or more of the occupancy map 144, the graph, the navigation map, or other representations of the physical space 102. The autonomous navigation module 152 is discussed in more detail with regard to FIG. 2.

The AMD 104 may use network interfaces to connect to a network 178. For example, the network 178 may comprise a wireless local area network, that in turn is connected to a wide area network such as the Internet.

The docking station 182 may also be connected to the network 178. For example, the docking station 182 may be configured to connect to the wireless local area network 178 such that the docking station 182 and the AMD 104 may communicate.

The AMD 104 may access one or more servers 180 via the network 178. For example, the AMD 104 may utilize a wakeword detection module to determine if the user 108 is addressing a request to the AMD 104. The wakeword detection module may hear a specified word or phrase and transition the AMD 104 or portion thereof to the wake operating mode. Once in the wake operating mode, the AMD 104 may then transfer at least a portion of the audio spoken by the user 108 to one or more servers 180 for further processing. The servers 180 may process the spoken audio and return to the AMD 104 data that may be subsequently used to operate the AMD 104.

The AMD 104 may also communicate with other devices 176. The other devices 176 may include one or more devices that are within the physical space 102 such as a home or associated with operation of one or more devices in the physical space 102. For example, the other devices 176 may include a doorbell camera, a garage door opener, a refrigerator, washing machine, and so forth. In some implementations the other devices 176 may include other AMDs 104, vehicles, and so forth.

In other implementations, other types of autonomous mobile devices (AMD) may use the systems and techniques described herein. For example, the AMD 104 may comprise an autonomous ground vehicle that is moving on a street, an autonomous aerial vehicle in the air, autonomous marine vehicle, and so forth.

Figure 2:
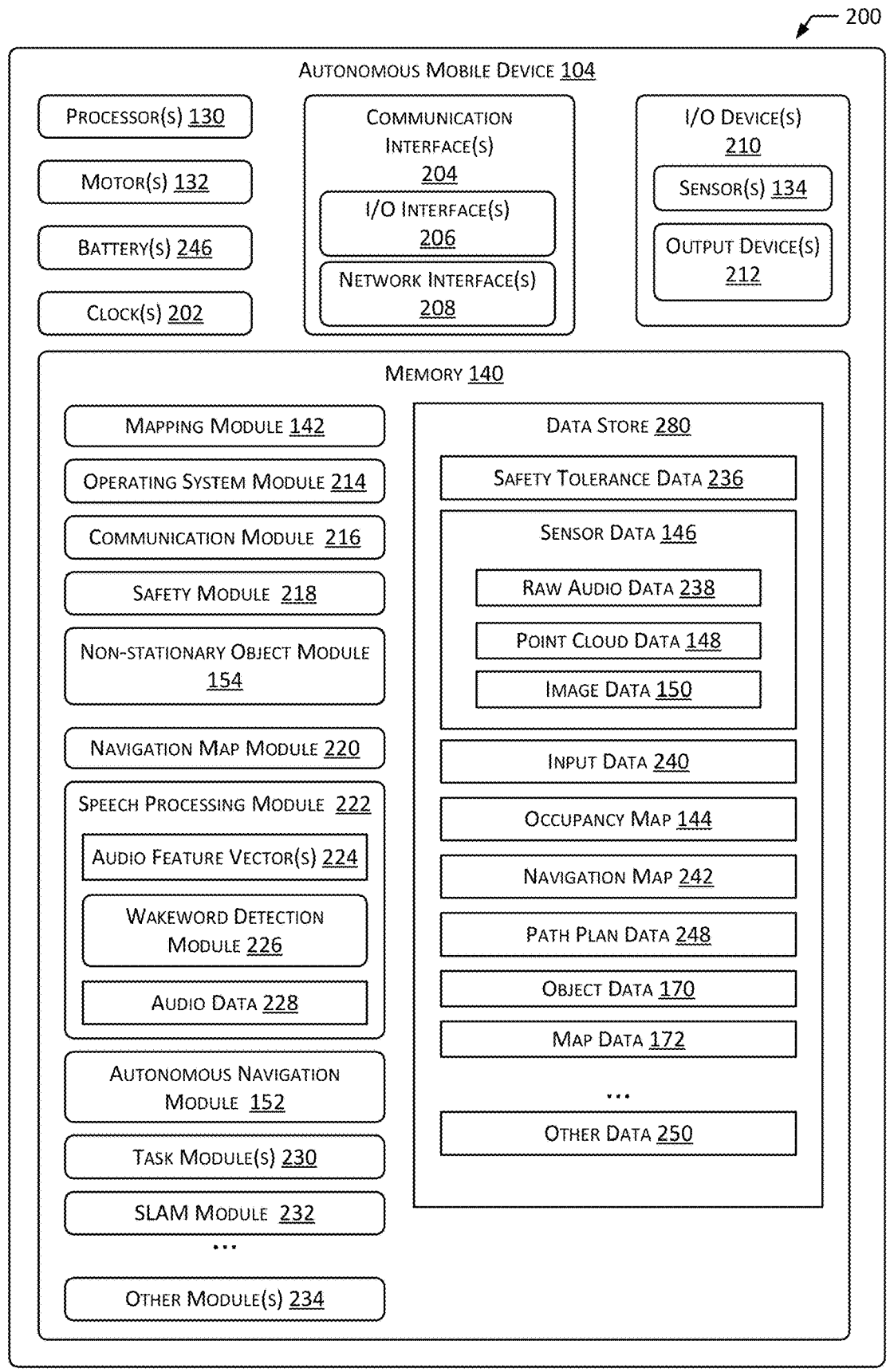
FIG. 2 is a block diagram of the components of the AMD, according to some implementations.

FIG. 2 is a block diagram 200 of the AMD 104, according to some implementations. The AMD 104 may include one or more batteries 246 to provide electrical power suitable for operating the components in the AMD 104. In some implementations other devices may be used to provide electrical power to the AMD 104. For example, power may be provided by wireless power transfer, capacitors, fuel cells, storage flywheels, and so forth.

An occupancy map 144 is determined using sensor data 146 from one or more sensors 134 and provides information about where objects are in the physical space 102. The occupancy map 144 comprises cells in a specified arrangement, a grid of cells. Each cell may be represented by an index value indicative of that cell within the grid. Each cell is associated with a particular location in the physical space 102. For example, each cell may represent an area in the physical space 102 that is 5 centimeters (cm) by 5 cm. Each cell may also be associated with an occupancy value that indicates whether the particular area in the physical space 102 associated with that cell is occupied by an object, unoccupied, or whether there is no data that is associated with that cell being unobserved. For example, an occupancy value of −1 may indicate an unoccupied cell with no object, an occupancy value of 0 indicates the cell has been unobserved, while +1 indicates the cell is occupied by an object. For ease of discussion, and not necessarily as a limitation, description with regard to cells may refer to the data associated with the cells or, as appropriate, the physical space associated with the cell. For example, an action such as moving to a cell may comprise moving the AMD 104 to the physical space 102 associated with the cell.

The sensors 134 on the AMD 104 or in the physical space 102 acquire the sensor data 146. The sensor data 146 is processed to determine information such as a current location of the AMD 104 in the physical space 102, and to provide the information that is used to determine the occupancy map 144. The sensors 134 exhibit various limitations, including a particular field of view (FOV) 110, working range, may require line of sight to operate, exhibit blind spots, and so forth. Except for very unusual circumstances such as very simple physical spaces, the sensors 134 are not able to simultaneously see all of the areas in the physical space 102. As a result, the AMD 104 gathers information about the physical space 102 by moving and directing the FOV 110 of the sensors 134 in different directions.

As the AMD 104 moves through the physical space 102, it uses simultaneous localization and mapping (SLAM) to determine where it is and how far it has moved. Localization is the process of determining where the AMD 104 is in the physical space 102. For example, cameras may acquire images. These images are processed to determine the presence of features in the images, such as edges of doors, a picture frame on a wall, and so forth. A descriptor is information that describes a particular feature. Various techniques such a scale-invariant feature transform (SIFT) may be used to characterize the features and generate the descriptors. The SLAM may use data from other sensors such as motor encoders, inertial measurement units (IMU) with one or more accelerometers and gyroscopes, and so forth.

While the AMD 104 is moving and SLAM is operating, SLAM provides as output a series of poses, each pose describing a location and rotations in space that are based at least in part on the apparent motion of observed features in the images. For example, a pose may comprise information about six dimensions (6D), that of three orthogonal axes and corresponding rotations about those axes. These poses may be combined to provide a trajectory of the AMD.

While the AMD is moving, other sensors 134 are acquiring information about the physical space 102. One or more depth sensors may acquire depth data about the presence or absence of objects in the physical space 102. For example, the depth sensors may comprise a time-of-flight (TOF) depth camera, ultrasound, radar, and so forth. The depth data provided by a depth sensor is indicative of whether an object is detected or not, and also includes information about the distance between the sensor 134 and the object and relative direction with respect to the sensor 134 and an object, if detected.

Depth sensors such as ultrasonic sensors, optical sensors such as a TOF depth camera, LIDAR, radar, and so forth may provide depth data that is indicative of the presence or absence of objects in the physical space 102 within the FOV 110 of the depth sensor. For example, a sensor 134 such as a TOF depth camera may emit a pulse of infrared light and use a detected return time for reflected light to determine a distance between the sensor and the object that reflected the light. The depth data may be expressed as point cloud data, volumetric data, bearing and distance data, and so forth. The depth data may be used to determine the occupancy map 144.

The AMD 104 may include one or more network interfaces 208. The network interfaces 208 may include devices to connect to personal area networks (PANS), local area networks (LANs), wireless local area networks (WLANS), wide area networks (WANs), and so forth. For example, the network interfaces 208 may include devices compatible with Ethernet, Wi-Fi, Bluetooth, Bluetooth Low Energy, ZigBee, and so forth.

The AMD 104 may include battery(s) 246 to provide electrical power for operation of the AMD 104. The battery 246 may be rechargeable, allowing it to store electrical energy obtained from an external source. In other implementations a wireless power receiver may be used to provide power for operation of the AMD 104, recharge the battery 246, and so forth.

The AMD 104 includes one or more memories 140. The memory 140 may comprise one or more non-transitory computer-readable storage media (CRSM).

The AMD 104 may include one or more sensors 134. For example, the sensors 134 may include microphones, a microphone array, time-of-flight (TOF) sensors, cameras, LIDAR, and so forth. The sensors 134 may generate sensor data 146. The sensors 134 are discussed in more detail with regard to FIG. 3.

During operation, the AMD 104 may determine input data 240. The input data 240 may include or be based at least in part on sensor data 146 from the sensors 134 onboard the AMD 104. In one implementation, a speech processing module 222 may process raw audio data 238 obtained by a microphone on the AMD 104 and produce input data 240. For example, the user may say "robot, come here" which may produce input data 240 "come here". In another implementation, the input data 240 may comprise information such as a command provided by another computing device, such as a smartphone or tablet computer.

While the AMD 104 is moving, the SLAM module 232 may provide as output a series of poses, each pose describing a location and rotations in the physical space 102. Each pose is based at least in part on the apparent motion of observed features in images acquired by the AMD 104. For example, from image to image at least some of the features that are described by descriptors will be in common. By determining the relative difference in apparent position in the image of the same feature as observed by two different cameras at the same time, the location of the camera with respect to the feature in the physical space 102 may be determined. During successive times, as the AMD 104 moves and additional images are acquired from locations in the physical space 102, the apparent change in position of the same feature across the additional images may be used to determine subsequent poses. In some implementations a pose may comprise information about six dimensions (6D), that of three orthogonal axes and corresponding rotations about those axes.

The SLAM module 232 may also use data from other sensors 134 such as motor encoders, inertial measurement units (IMU) with one or more accelerometers and gyroscopes, and so forth. For example, inertial data indicative of rotations, accelerations along particular axes, and so forth obtained from the IMU may be integrated to provide information about the movement of the AMD 104.

A set of poses generated by the SLAM module 232 over time describe the trajectory. For example, trajectory data may comprise a time series of pose data from the SLAM module 232.

During operation, the mapping module 142 may use the SLAM module 232 to determine pose data. The pose data may comprise information indicative of pose. For example, the pose data may include information indicative of a location in the physical space 102 and orientation of the AMD 104 relative to the physical space 102. The SLAM module 232 may use one or more of: the point cloud data 148, the image data 150, or data from other sensors 134. The pose data may be used by other modules. For example, the locations of candidate objects 114 or 118 may be determined based on the pose data. Continuing the example, based on the pose data specifying the location in the physical space 102 and orientation of the AMD 104, the point cloud data 148 acquired may be associated with a particular location in the physical space 102.

A navigation map module 220 uses the occupancy map 144 as input to generate a navigation map 242. For example, the navigation map module 220 may produce the navigation map 242 by inflating or enlarging the apparent size of objects as indicated by the occupancy map 144.

The AMD 104 may utilize one or more task modules 230. The task module 230 comprises instructions that, when executed, provide one or more functions. The task modules 230 may perform functions such as finding a user 108, following a user 108, present output on output devices 212 of the AMD 104, perform sentry tasks by moving the AMD 104 through the physical space 102 to determine the presence of unauthorized people, and so forth.

The AMD 104 includes one or more output devices 212, such as one or more of a motor 132, light, speaker, display, projector, printer, and so forth. One or more output devices 212 may be used to provide output during operation of the AMD 104. The output devices 212 are discussed in more detail with regard to FIG. 3.

One or more clocks 202 may provide information indicative of date, time, ticks, and so forth. For example, the processor 130 may use data from the clock 202 to associate a particular time with an action, sensor data 146, and so forth.

The AMD 104 may include one or more hardware processors 130 (processors) configured to execute one or more stored instructions. The processors 130 may comprise one or more cores. The processors 130 may include microcontrollers, systems on a chip, field programmable gate arrays, digital signal processors, graphic processing units, general processing units, and so forth.

The AMD 104 may include one or more communication interfaces 204 such as input/output (I/O) interfaces 206, network interfaces 208, and so forth. The communication interfaces 204 enable the AMD 104, or components thereof, to communicate with other devices 176 or components. The communication interfaces 204 may include one or more I/O interfaces 206. The I/O interfaces 206 may comprise Inter-Integrated Circuit (I2C), Serial Peripheral Interface bus (SPI), Universal Serial Bus (USB) as promulgated by the USB Implementers Forum, RS-232, and so forth.

The I/O interface(s) 206 may couple to one or more I/O device 210. The I/O device 210 may include input devices such as one or more of a sensor 134, keyboard, mouse, scanner, and so forth. The I/O device 210 may also include output devices 212 such as one or more of a motor 132, light, speaker, display, projector, printer, and so forth. In some embodiments, the I/O devices 210 may be physically incorporated with the AMD 104 or may be externally placed.

The network interfaces 208 may be configured to provide communications between the AMD 104 and other devices 176 such as other AMDs 104, docking stations 182, routers, access points, and so forth. The network interfaces 208 may include devices configured to couple to personal area networks (PANS), local area networks (LANs), wireless local area networks (WLANS), wide area networks (WANs), and so forth. For example, the network interfaces 208 may include devices compatible with Ethernet, Wi-Fi, Bluetooth, Bluetooth Low Energy, ZigBee, and so forth. The AMD 104 may also include one or more buses or other internal communications hardware or software that allow for the transfer of data between the various modules and components of the AMD 104.

As shown in FIG. 2, the AMD 104 includes one or more memories 140. The memory 140 may comprise one or more non-transitory computer-readable storage media (CRSM). The CRSM may be any one or more of an electronic storage medium, a magnetic storage medium, an optical storage medium, a quantum storage medium, a mechanical computer storage medium, and so forth. The memory 140 provides storage of computer-readable instructions, data structures, program modules, and other data for the operation of the AMD 104. A few example functional modules are shown stored in the memory 140, although the same functionality may alternatively be implemented in hardware, firmware, or as a system on a chip (SoC).

The memory 140 may include at least one operating system (OS) module 214. The OS module 214 is configured to manage hardware resource devices such as the I/O interfaces 206, the I/O device 210, the communication interfaces 204, and provide various services to applications or modules executing on the processors 130. The OS module 214 may implement a variant of the FreeBSD operating system as promulgated by the FreeBSD Project; other UNIX or UNIX-like variants; a variation of the Linux operating system as promulgated by Linus Torvalds; the Windows operating system from Microsoft Corporation of Redmond, Washington, USA; the Robot Operating System (ROS), and so forth.

Also stored in the memory 140 may be a data store 280 and one or more of the following modules. These modules may be executed as foreground applications, background tasks, daemons, and so forth. The data store 280 may use a flat file, database, linked list, tree, executable code, script, or other data structure to store information. In some implementations, the data store 280 or a portion of the memory 140 may be distributed across one or more other devices 176 including other AMDs 104, servers 180, network attached storage devices, and so forth.

A communication module 216 may be configured to establish communication with other devices 176, such as other AMDs 104, an external server 180, a docking station 182, and so forth. The communications may be authenticated, encrypted, and so forth.

Other modules within the memory 140 may include a safety module 218, the mapping module 142, the navigation map module 220, the autonomous navigation module 152, the one or more task modules 230, a speech processing module 222, or other modules 234. The modules may access memory within the data store 280, including safety tolerance data 236, sensor data 146, other data 250, and so forth.

The safety module 218 may access the safety tolerance data 236 to determine within what tolerances the AMD 104 may operate safely within the physical space 102. For example, the safety module 218 may be configured to stop the AMD 104 from moving when an extensible mast of the AMD 104 is extended. In another example, the safety tolerance data 236 may specify a minimum sound threshold which, when exceeded, stops all movement of the AMD 104. Continuing this example, detection of sound such as a human yell would stop the AMD 104. In another example, the safety module 218 may access safety tolerance data 236 that specifies a minimum distance from an object that the AMD 104 is to maintain. Continuing this example, when a sensor 134 detects an object has approached to less than or equal to the minimum distance, all movement of the AMD 104 may be stopped. Movement of the AMD 104 may be stopped by one or more of inhibiting operations of one or more of the motors 132, issuing a command to stop motor operation, disconnecting power from one or more the motors 132, and so forth. The safety module 218 may be implemented as hardware, software, or a combination thereof.

The safety module 218 may control other factors, such as a maximum speed of the AMD 104 based on information obtained by the sensors 134, precision and accuracy of the sensor data 146, and so forth. For example, detection of an object by an optical sensor may include some error, such as when the distance to an object comprises a weighted average between the object and a background. As a result, the maximum speed permitted by the safety module 218 may be based on one or more factors such as the weight of the AMD 104, nature of the floor, distance to the object, and so forth.

In the event that the maximum permissible speed differs from the maximum speed permitted by the safety module 218, the lesser speed may be utilized.

The navigation map module 220 uses the occupancy map 144 as input to generate the navigation map 242. The navigation map module 220 may produce the navigation map 242 to inflate or enlarge the objects indicated by the occupancy map 144. One or more inflation parameters may be used during operation. The inflation parameters provide information such as inflation distance, inflation adjustment values, and so forth. In some implementations the inflation parameters may be based at least in part on the sensor FOV 110, sensor blind spot, physical dimensions of the AMD 104, and so forth.

The speech processing module 222 may be used to process utterances of the user 108. Microphones may acquire audio in the presence of the AMD 104 and may send raw audio data 238 to an acoustic front end (AFE). The AFE may transform the raw audio data 238 (for example, a single-channel, 16-bit audio stream sampled at 16 kHz), captured by the microphone, into audio feature vectors 224 that may ultimately be used for processing by various components, such as a wakeword detection module 226, speech recognition engine, or other components. The AFE may reduce noise in the raw audio data 238. The AFE may also perform acoustic echo cancellation (AEC) or other operations to account for output audio data that may be sent to a speaker of the AMD 104 for output. For example, the AMD 104 may be playing music or other audio that is being received from a network 178 in the form of output audio data. To avoid the output audio interfering with the device's ability to detect and process input audio, the AFE or other component may perform echo cancellation to remove the output audio data from the input raw audio data 238, or other operations.

The AFE may divide the raw audio data 238 into frames representing time intervals for which the AFE determines a number of values (i.e., features) representing qualities of the raw audio data 238, along with a set of those values (i.e., a feature vector or audio feature vector 224) representing features/qualities of the raw audio data 238 within each frame. A frame may be a certain period of time, for example a sliding window of 25 ms of audio data 228 taken every 10 ms, or the like. Many different features may be determined, as known in the art, and each feature represents some quality of the audio that may be useful for automatic speech recognition (ASR) processing, wakeword detection, presence detection, or other operations. A number of approaches may be used by the AFE to process the raw audio data 238, such as mel-frequency cepstral coefficients (MFCCs), log filter-bank energies (LFBEs), perceptual linear predictive (PLP) techniques, neural network feature vector techniques, linear discriminant analysis, semi-tied covariance matrices, or other approaches known to those skilled in the art.

The audio feature vectors 224 (or the raw audio data 238) may be input into a wakeword detection module 226 that is configured to detect keywords spoken in the audio. The wakeword detection module 226 may use various techniques to determine whether audio data 228 includes speech. Some embodiments may apply voice activity detection (VAD) techniques. Such techniques may determine whether speech is present in an audio input based on various quantitative aspects of the audio input, such as the spectral slope between one or more frames of the audio input; the energy levels of the audio input in one or more spectral bands; the signal-to-noise ratios of the audio input in one or more spectral bands; or other quantitative aspects. In other embodiments, the AMD 104 may implement a limited classifier configured to distinguish speech from background noise. The classifier may be implemented by techniques such as linear classifiers, support vector machines, and decision trees. In still other embodiments, Hidden Markov Model (HMM) or Gaussian Mixture Model (GMM) techniques may be applied to compare the audio input to one or more acoustic models in speech storage, which acoustic models may include models corresponding to speech, noise (such as environmental noise or background noise), or silence. Still other techniques may be used to determine whether speech is present in the audio input.

Once speech is detected in the audio received by the AMD 104 (or separately from speech detection), the AMD 104 may use the wakeword detection module 226 to perform wakeword detection to determine when a user intends to speak a command to the AMD 104. This process may also be referred to as keyword detection, with the wakeword being a specific example of a keyword. Specifically, keyword detection is typically performed without performing linguistic analysis, textual analysis, or semantic analysis. Instead, incoming audio is analyzed to determine if specific characteristics of the audio match preconfigured acoustic waveforms, audio signatures, or other data to determine if the incoming audio "matches" stored audio data corresponding to a keyword.

Thus, the wakeword detection module 226 may compare audio data 228 to stored models or data to detect a wakeword. One approach for wakeword detection applies general large vocabulary continuous speech recognition (LVCSR) systems to decode the audio signals, with wakeword searching conducted in the resulting lattices or confusion networks. LVCSR decoding may require relatively high computational resources. Another approach for wakeword spotting builds HMMs for each key wakeword word and non-wakeword speech signals respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on keyword presence. This approach can be extended to include discriminative information by incorporating a hybrid deep neural network (DNN) Hidden Markov Model (HMM) decoding framework. In another embodiment, the wakeword spotting system may be built on DNN/recursive neural network (RNN) structures directly, without HMM involved. Such a system may estimate the posteriors of wakewords with context information, either by stacking frames within a context window for DNN, or using RNN. Following on, posterior threshold tuning or smoothing is applied for decision making. Other techniques for wakeword detection, such as those known in the art, may also be used.

Once the wakeword is detected, circuitry or applications of the local AMD 104 may "wake" and begin transmitting audio data 228 (which may include one or more of the raw audio data 238 or the audio feature vectors 224) to one or more server(s) 180 for speech processing. The audio data 228 corresponding to audio obtained by the microphone may be processed locally on one or more of the processors 130, sent to a server 180 for routing to a recipient device or may be sent to the server 180 for speech processing for interpretation of the included speech (either for purposes of enabling voice-communications and/or for purposes of executing a command in the speech). The audio data 228 may include data corresponding to the wakeword, or the portion of the audio data 228 corresponding to the wakeword may be removed by the AMD 104 before processing by the navigation map module 220, prior to sending to the server 180, and so forth.

The speech processing module 222 may include or access an automated speech recognition (ASR) module. The ASR module may accept as input raw audio data 238, audio feature vectors 224, or other sensor data 146 and so forth and may produce as output the input data 240 comprising a text string or other data representation. The input data 240 comprising the text string or other data representation may be processed by the navigation map module 220 to determine the command to be executed. For example, the utterance of the command "robot, come here" may result in input data 240 comprising the text string "come here". The wakeword "robot" may be omitted from the input data 240.

The mapping module 142 may use one or more simultaneous localization and mapping ("SLAM") techniques. The SLAM algorithms may utilize one or more of maps, algorithms, beacons, or other techniques to navigate. The autonomous navigation module 152 may use the navigation map 242 to determine a set of possible paths along which the AMD 104 may move. One of these may be selected and used to determine path plan data 248 indicative of a path. For example, a possible path that is the shortest or has the fewest turns may be selected and used to determine the path. The path is then subsequently used to determine a set of commands that drive the motors 132 connected to the wheels. For example, the autonomous navigation module 152 may determine the current location within the physical space 102 and determine path plan data 248 that describes the path to a destination location such as the docking station 182.

The autonomous navigation module 152 may utilize various techniques during processing of sensor data 146. For example, image data 150 obtained from cameras on the AMD 104 may be processed to determine one or more of corners, edges, planes, and so forth. In some implementations, corners may be detected, and the coordinates of those corners may be used to produce point cloud data. This point cloud data may then be used for SLAM or other purposes associated with mapping, navigation, and so forth.

The AMD 104 may move responsive to a determination made by an onboard processor 130, in response to a command received from one or more communication interfaces 204, as determined from the sensor data 146, and so forth. For example, an external server 180 may send a command that is received using the network interface 208. This command may direct the AMD 104 to proceed to find a particular user 108, follow a particular user 108, and so forth. The AMD 104 may then process this command and use the autonomous navigation module 152 to determine the directions and distances associated with carrying out the command. For example, the command to "come here" may result in the task module 230 sending a command to the autonomous navigation module 152 to move the AMD 104 to a particular location near the user 108 and orient the AMD 104 in a particular direction.

The AMD 104 may connect to the network 178 using one or more of the network interfaces 208. In some implementations, one or more of the modules or other functions described here may execute on the processors 130 of the AMD 104, on the server 180, or a combination thereof. For example, one or more servers 180 may provide various functions, such as ASR, natural language understanding (NLU), providing content such as audio or video to the AMD 104, and so forth.

The other modules 234 may provide other functionality, such as object recognition, speech synthesis, user identification, and so forth. The other modules 234 may comprise a speech synthesis module that is able to convert text data to human speech. For example, the speech synthesis module may be used by the AMD 104 to provide speech that a user 108 is able to understand.

The data store 280 may store the other data 250 as well. For example, localization settings may indicate local preferences such as language, user identifier data may be stored that allows for identification of a particular user, and so forth.

Figure 3:
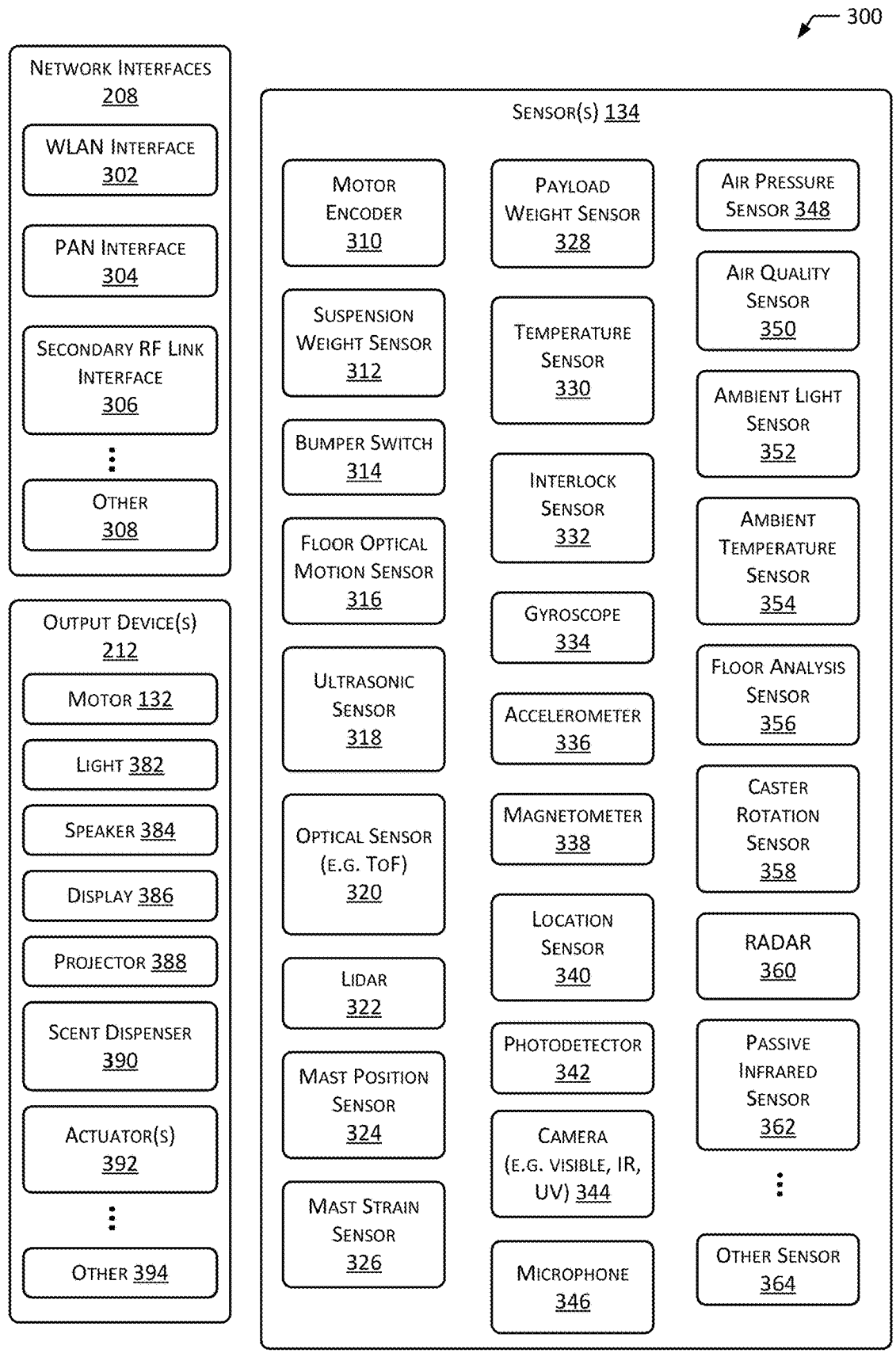
FIG. 3 is a block diagram of some components of the AMD, such as network interfaces, sensors, and output devices, according to some implementations.

FIG. 3 is a block diagram 300 of some components of the AMD 104 such as network interfaces 208, sensors 134, and output devices 212, according to some implementations. The components illustrated here are provided by way of illustration and not necessarily as a limitation. For example, the AMD 104 may utilize a subset of the particular network interfaces 208, output devices 212, or sensors 134 depicted here, or may utilize components not pictured. One or more of the sensors 134, output devices 212, or a combination thereof may be included on a moveable component that may be panned, tilted, rotated, or any combination thereof with respect to a chassis of the AMD 104.

The network interfaces 208 may include one or more of a WLAN interface 302, PAN interface 304, secondary radio frequency (RF) link interface 306, or other interface 308. The WLAN interface 302 may be compliant with at least a portion of the Wi-Fi specification. For example, the WLAN interface 302 may be compliant with at least a portion of the IEEE 802.11 specification as promulgated by the Institute of Electrical and Electronics Engineers (IEEE). The PAN interface 304 may be compliant with at least a portion of one or more of the Bluetooth, wireless USB, Z-Wave, ZigBee, or other standards. For example, the PAN interface 304 may be compliant with the Bluetooth Low Energy (BLE) specification.

The secondary RF link interface 306 may comprise a radio transmitter and receiver that operate at frequencies different from or using modulation different from the other interfaces. For example, the WLAN interface 302 may utilize frequencies in the 2.4 GHz and 5 GHz Industrial Scientific and Medicine (ISM) bands, while the PAN interface 304 may utilize the 2.4 GHz ISM bands. The secondary RF link interface 306 may comprise a radio transmitter that operates in the 900 MHz ISM band, within a licensed band at another frequency, and so forth. The secondary RF link interface 306 may be utilized to provide backup communication between the AMD 104 and other devices 176 in the event that communication fails using one or more of the WLAN interface 302 or the PAN interface 304. For example, in the event the AMD 104 travels to an area within the physical space 102 that does not have Wi-Fi coverage, the AMD 104 may use the secondary RF link interface 306 to communicate with another device such as a specialized access point, docking station 182, or other AMD 104.

The other 308 network interfaces may include other equipment to send or receive data using other wavelengths or phenomena. For example, the other 308 network interface may include an ultrasonic transceiver used to send data as ultrasonic sounds, a visible light system that communicates by modulating a visible light source such as a light-emitting diode, and so forth. In another example, the other 308 network interface may comprise a wireless wide area network (WWAN) interface or a wireless cellular data network interface. Continuing the example, the other 308 network interface may be compliant with at least a portion of the 4G, LTE, 5G, or other standards.

The AMD 104 may include one or more of the following sensors 134. The sensors 134 depicted here are provided by way of illustration and not necessarily as a limitation. It is understood that other sensors 134 may be included or utilized by the AMD 104, while some sensors 134 may be omitted in some configurations.

A motor encoder 310 provides information indicative of the rotation or linear extension of a motor 132. The motor 132 may comprise a rotary motor, or a linear actuator. In some implementations, the motor encoder 310 may comprise a separate assembly such as a photodiode and encoder wheel that is affixed to the motor 132. In other implementations, the motor encoder 310 may comprise circuitry configured to drive the motor 132. For example, the autonomous navigation module 152 may utilize the data from the motor encoder 310 to estimate a distance traveled.

A suspension weight sensor 312 provides information indicative of the weight of the AMD 104 on the suspension system for one or more of the wheels or the caster. For example, the suspension weight sensor 312 may comprise a switch, strain gauge, load cell, photodetector 342, or other sensing element that is used to determine whether weight is applied to a particular wheel, or whether weight has been removed from the wheel. In some implementations, the suspension weight sensor 312 may provide binary data such as a "1" value indicating that there is a weight applied to the wheel, while a "0" value indicates that there is no weight applied to the wheel. In other implementations, the suspension weight sensor 312 may provide an indication such as so many kilograms of force or newtons of force. The suspension weight sensor 312 may be affixed to one or more of the wheels or the caster. In some situations, the safety module 218 may use data from the suspension weight sensor 312 to determine whether or not to inhibit operation of one or more of the motors 132. For example, if the suspension weight sensor 312 indicates no weight on the suspension, the implication is that the AMD 104 is no longer resting on its wheels, and thus operation of the motors 132 may be inhibited. In another example, if the suspension weight sensor 312 indicates weight that exceeds a threshold value, the implication is that something heavy is resting on the AMD 104 and thus operation of the motors 132 may be inhibited. For example, the threshold value may comprise a weight of a load that compresses a suspension system to a minimum height, or results in a mass that exceeds a torque output of the motors 132 to maintain a minimum acceleration.

One or more bumper switches 314 provide an indication of physical contact between a bumper or other member that is in mechanical contact with the bumper switch 314. The safety module 218 utilizes sensor data 146 obtained by the bumper switches 314 to modify the operation of the AMD 104. For example, if the bumper switch 314 associated with a front of the AMD 104 is triggered, the safety module 218 may drive the AMD 104 backwards.

A floor optical motion sensor (FOMS) 316 provides information indicative of motion of the AMD 104 relative to the floor or other surface underneath the AMD 104. In one implementation, the FOMS 316 may comprise a light source such as light-emitting diode (LED), an array of photodiodes, and so forth. In some implementations, the FOMS 316 may utilize an optoelectronic sensor, such as a low-resolution two-dimensional array of photodiodes. Several techniques may be used to determine changes in the data obtained by the photodiodes and translate this into data indicative of a direction of movement, velocity, acceleration, and so forth. In some implementations, the FOMS 316 may provide other information, such as data indicative of a pattern present on the floor, composition of the floor, color of the floor, and so forth. For example, the FOMS 316 may utilize an optoelectronic sensor that may detect different colors or shades of gray, and this data may be used to generate floor characterization data. The floor characterization data may be used for navigation.

An ultrasonic sensor 318 utilizes sounds in excess of 20 kHz to determine a distance from the sensor 134 to an object. The ultrasonic sensor 318 may comprise an emitter such as a piezoelectric transducer and a detector such as an ultrasonic microphone. The emitter may generate specifically timed pulses of ultrasonic sound while the detector listens for an echo of that sound being reflected from an object within the field of view. The ultrasonic sensor 318 may provide information indicative of a presence of an object, distance to the object, and so forth. Two or more ultrasonic sensors 318 may be utilized in conjunction with one another to determine a location within a two-dimensional plane of the object.

In some implementations, the ultrasonic sensor 318 or a portion thereof may be used to provide other functionality. For example, the emitter of the ultrasonic sensor 318 may be used to transmit data and the detector may be used to receive data transmitted that is ultrasonic sound. In another example, the emitter of an ultrasonic sensor 318 may be set to a particular frequency and used to generate a particular waveform such as a sawtooth pattern to provide a signal that is audible to an animal, such as a dog or a cat.

An optical sensor 320 may provide sensor data 146 indicative of one or more of a presence or absence of an object, a distance to the object, or characteristics of the object. The optical sensor 320 may use time-of-flight (ToF), structured light, interferometry, or other techniques to generate the distance data. For example, ToF determines a propagation time (or "round-trip" time) of a pulse of emitted light from an optical emitter or illuminator that is reflected or otherwise returned to an optical detector. By dividing the propagation time in half and multiplying the result by the speed of light in air, the distance to an object may be determined. The optical sensor 320 may utilize one or more sensing elements. For example, the optical sensor 320 may comprise a 4 ×4 array of light sensing elements. Each individual sensing element may be associated with a field of view (FOV) 110 that is directed in a different way. For example, the optical sensor 320 may have four light sensing elements, each associated with a different 10° FOV 110, allowing the sensor to have an overall FOV 110 of 40°.

In another implementation, a structured light pattern may be provided by the optical emitter. A portion of the structured light pattern may then be detected on the object using a sensor 134 such as an image sensor or camera 344. Based on an apparent distance between the features of the structured light pattern, the distance to the object may be calculated. Other techniques may also be used to determine distance to the object. In another example, the color of the reflected light may be used to characterize the object, such as whether the object is skin, clothing, flooring, upholstery, and so forth. In some implementations, the optical sensor 320 may operate as a depth camera, providing a two-dimensional image of a scene, as well as data that indicates a distance to each pixel.

Data from the optical sensors 320 may be utilized for collision avoidance. For example, the safety module 218 and the autonomous navigation module 152 may utilize the sensor data 146 indicative of the distance to an object in order to prevent a collision with that object.

Multiple optical sensors 320 may be operated such that their FOV 110 overlap at least partially. To minimize or eliminate interference, the optical sensors 320 may selectively control one or more of the timing, modulation, or frequency of the light emitted. For example, a first optical sensor 320 may emit light modulated at 30 kHz while a second optical sensor 320 emits light modulated at 33 kHz.

A lidar 322 sensor provides information indicative of a distance to an object or portion thereof by utilizing laser light. The laser is scanned across a scene at various points, emitting pulses which may be reflected by objects within the scene. Based on the time-of-flight distance to that particular point, sensor data 146 may be generated that is indicative of the presence of objects and the relative positions, shapes, and so forth that are visible to the lidar 322. Data from the lidar 322 may be used by various modules. For example, the autonomous navigation module 152 may utilize point cloud data generated by the lidar 322 for localization of the AMD 104 within the physical space 102.

The AMD 104 may include a mast. A mast position sensor 324 provides information indicative of a position of the mast of the AMD 104. For example, the mast position sensor 324 may comprise limit switches associated with the mast extension mechanism that indicate whether the mast is at an extended or retracted position. In other implementations, the mast position sensor 324 may comprise an optical code on at least a portion of the mast that is then interrogated by an optical emitter and a photodetector 342 to determine the distance to which the mast is extended. In another implementation, the mast position sensor 324 may comprise an encoder wheel that is attached to a mast motor that is used to raise or lower the mast. The mast position sensor 324 may provide data to the safety module 218. For example, if the AMD 104 is preparing to move, data from the mast position sensor 324 may be checked to determine if the mast is retracted, and if not, the mast may be retracted prior to beginning movement.

A mast strain sensor 326 provides information indicative of a strain on the mast with respect to the remainder of the AMD 104. For example, the mast strain sensor 326 may comprise a strain gauge or load cell that measures a side-load applied to the mast or a weight on the mast or downward pressure on the mast. The safety module 218 may utilize sensor data 146 obtained by the mast strain sensor 326. For example, if the strain applied to the mast exceeds a threshold amount, the safety module 218 may direct an audible and visible alarm to be presented by the AMD 104.

The AMD 104 may include a modular payload bay. A payload weight sensor 328 provides information indicative of the weight associated with the modular payload bay. The payload weight sensor 328 may comprise one or more sensing mechanisms to determine the weight of a load. These sensing mechanisms may include piezoresistive devices, piezoelectric devices, capacitive devices, electromagnetic devices, optical devices, potentiometric devices, microelectromechanical devices, and so forth. The sensing mechanisms may operate as transducers that generate one or more signals based on an applied force, such as that of the load due to gravity. For example, the payload weight sensor 328 may comprise a load cell having a strain gauge and a structural member that deforms slightly when weight is applied. By measuring a change in the electrical characteristic of the strain gauge, such as capacitance or resistance, the weight may be determined. In another example, the payload weight sensor 328 may comprise a force sensing resistor (FSR). The FSR may comprise a resilient material that changes one or more electrical characteristics when compressed. For example, the electrical resistance of a particular portion of the FSR may decrease as the particular portion is compressed. In some implementations, the safety module 218 may utilize the payload weight sensor 328 to determine if the modular payload bay has been overloaded. If so, an alert or notification may be issued.

One or more device temperature sensors 330 may be utilized by the AMD 104. The device temperature sensors 330 provide temperature data of one or more components within the AMD 104. For example, a device temperature sensor 330 may indicate a temperature of one or more the batteries 246, one or more motors 132, and so forth. In the event the temperature exceeds a threshold value, the component associated with that device temperature sensor 330 may be shut down. For example, the threshold value may be determined based on component specifications, such as a maximum permissible temperature of the batteries 246.

One or more interlock sensors 332 may provide data to the safety module 218 or other circuitry that prevents the AMD 104 from operating in an unsafe condition. For example, the interlock sensors 332 may comprise switches that indicate whether an access panel is open. The interlock sensors 332 may be configured to inhibit operation of the AMD 104 until the interlock switch indicates a safe condition is present.

A gyroscope 334 may provide information indicative of rotation of an object affixed thereto. For example, a gyroscope 334 may generate sensor data 146 that is indicative of a change in orientation of the AMD 104 or a portion thereof.

An accelerometer 336 provides information indicative of a direction and magnitude of an imposed acceleration. Data such as rate of change, determination of changes in direction, speed, and so forth may be determined using the accelerometer 336. The accelerometer 336 may comprise mechanical, optical, micro-electromechanical, or other devices. For example, the gyroscope 334 in the accelerometer 336 may comprise a prepackaged solid-state inertial measurement unit (IMU) that provides multiple axis gyroscopes 334 and accelerometers 336.

A magnetometer 338 may be used to determine an orientation by measuring ambient magnetic fields, such as the terrestrial magnetic field. For example, the magnetometer 338 may comprise a Hall effect transistor that provides output compass data indicative of a magnetic heading.

The AMD 104 may include one or more location sensors 340. The location sensors 340 may comprise an optical, radio, or other navigational system such as a global positioning system (GPS) receiver. For indoor operation, the location sensors 340 may comprise indoor position systems, such as using Wi-Fi Positioning Systems (WPS). The location sensors 340 may provide information indicative of a relative location, such as "living room" or an absolute location such as particular coordinates indicative of latitude and longitude, or displacement with respect to a predefined origin.

A photodetector 342 provides sensor data 146 indicative of impinging light. For example, the photodetector 342 may provide data indicative of a color, intensity, duration, and so forth.

A camera 344 generates sensor data 146 indicative of one or more images. The camera 344 may be configured to detect light in one or more wavelengths including, but not limited to, terahertz, infrared, visible, ultraviolet, and so forth. For example, an infrared camera 344 may be sensitive to wavelengths between approximately 700 nanometers and 1 millimeter. The camera 344 may comprise charge coupled devices (CCD), complementary metal oxide semiconductor (CMOS) devices, microbolometers, and so forth. The AMD 104 may use image data acquired by the camera 344 for object recognition, navigation, collision avoidance, user communication, and so forth. For example, a pair of cameras 344 sensitive to infrared light may be mounted on the front of the AMD 104 to provide binocular stereo vision, with the sensor data 146 comprising images being sent to the autonomous navigation module 152. In another example, the camera 344 may comprise a 10 megapixel or greater camera that is used for videoconferencing or for acquiring pictures for the user.

The camera 344 may include a global shutter or a rolling shutter. The shutter may be mechanical or electronic. A mechanical shutter uses a physical device such as a shutter vane or liquid crystal to prevent light from reaching a light sensor. In comparison, an electronic shutter comprises a specific technique of how the light sensor is read out, such as progressive rows, interlaced rows, and so forth. With a rolling shutter, not all pixels are exposed at the same time. For example, with an electronic rolling shutter, rows of the light sensor may be read progressively, such that the first row on the sensor was taken at a first time while the last row was taken at a later time. As a result, a rolling shutter may produce various image artifacts, especially with regard to images in which objects are moving. In contrast, with a global shutter the light sensor is exposed all at a single time, and subsequently read out. In some implementations, the camera(s) 344, particularly those associated with navigation or autonomous operation, may utilize a global shutter. In other implementations, the camera(s) 344 providing images for use by the autonomous navigation module 152 may be acquired using a rolling shutter and subsequently may be processed to mitigate image artifacts.

One or more microphones 346 may be configured to acquire information indicative of sound present in the physical space 102. In some implementations, arrays of microphones 346 may be used. These arrays may implement beamforming techniques to provide for directionality of gain. The AMD 104 may use the one or more microphones 346 to acquire information from acoustic tags, accept voice input from users, determine a direction of an utterance, determine ambient noise levels, for voice communication with another user or system, and so forth.

An air pressure sensor 348 may provide information indicative of an ambient atmospheric pressure or changes in ambient atmospheric pressure. For example, the air pressure sensor 348 may provide information indicative of changes in air pressure due to opening and closing of doors, weather events, and so forth.

An air quality sensor 350 may provide information indicative of one or more attributes of the ambient atmosphere. For example, the air quality sensor 350 may include one or more chemical sensing elements to detect the presence of carbon monoxide, carbon dioxide, ozone, and so forth. In another example, the air quality sensor 350 may comprise one or more elements to detect particulate matter in the air, such as the photoelectric detector, ionization chamber, and so forth. In another example, the air quality sensor 350 may include a hygrometer that provides information indicative of relative humidity.

An ambient light sensor 352 may comprise one or more photodetectors 342 or other light-sensitive elements that are used to determine one or more of the color, intensity, or duration of ambient lighting around the AMD 104.

An ambient temperature sensor 354 provides information indicative of the temperature of the ambient physical space 102 proximate to the AMD 104. In some implementations, an infrared temperature sensor may be utilized to determine the temperature of another object at a distance.

A floor analysis sensor 356 may include one or more components that are used to generate at least a portion of floor characterization data. In one implementation, the floor analysis sensor 356 may comprise circuitry that may be used to determine one or more of the electrical resistance, electrical inductance, or electrical capacitance of the floor. For example, two or more of the wheels in contact with the floor may include an allegedly conductive pathway between the circuitry and the floor. By using two or more of these wheels, the circuitry may measure one or more of the electrical properties of the floor. Information obtained by the floor analysis sensor 356 may be used by one or more of the safety module 218, the autonomous navigation module 152, the task module 230, and so forth. For example, if the floor analysis sensor 356 determines that the floor is wet, the safety module 218 may decrease the speed of the AMD 104 and generate a notification alerting the user 108.

The floor analysis sensor 356 may include other components as well. For example, a coefficient of friction sensor may comprise a probe that comes into contact with the surface and determines the coefficient of friction between the probe and the floor.

A caster rotation sensor 358 provides data indicative of one or more of a direction of orientation, angular velocity, linear speed of the caster, and so forth. For example, the caster rotation sensor 358 may comprise an optical encoder and corresponding target that is able to determine that the caster transitioned from an angle of 0° at a first time to 49° at a second time.

The sensors 134 may include a radar 360. The radar 360 may be used to provide information as to a distance, lateral position, and so forth, to an object.

The sensors 134 may include a passive infrared (PIR) sensor 362. The PIR 362 sensor may be used to detect the presence of users, pets, hotspots, and so forth. For example, the PIR sensor 362 may be configured to detect infrared radiation with wavelengths between 8 and 14 micrometers.

The AMD 104 may include other sensors 364 as well. For example, a capacitive proximity sensor may be used to provide proximity data to adjacent objects. Other sensors 364 may include radio frequency identification (RFID) readers, near field communication (NFC) systems, coded aperture cameras, and so forth. For example, NFC tags may be placed at various points within the physical space 102 to provide landmarks for the autonomous navigation module 152. One or more touch sensors may be utilized to determine contact with a user 108 or other objects.

The AMD 104 may include one or more output devices 212. A motor 132 may be used to provide linear or rotary motion. A light 382 may be used to emit photons. A speaker 384 may be used to emit sound. A display 386 may comprise one or more of a liquid crystal display, light emitting diode display, electrophoretic display, cholesteric liquid crystal display, interferometric display, and so forth. The display 386 may be used to present visible information such as graphics, pictures, text, and so forth. In some implementations, the display 386 may comprise a touchscreen that combines a touch sensor and a display 386.

In some implementations, the AMD 104 may be equipped with a projector 388. The projector 388 may be able to project an image on a surface, such as the floor, wall, ceiling, and so forth.

A scent dispenser 390 may be used to emit one or more smells. For example, the scent dispenser 390 may comprise a plurality of different scented liquids that may be evaporated or vaporized in a controlled fashion to release predetermined amounts of each.

One or more moveable component actuators 392 may comprise an electrically operated mechanism such as one or more of a motor, solenoid, piezoelectric material, electroactive polymer, shape-memory alloy, and so forth. The actuator controller may be used to provide a signal or other input that operates one or more of the moveable component actuators 392 to produce movement of the moveable component.

In other implementations, other 394 output devices may be utilized. For example, the AMD 104 may include a haptic output device that provides output that produces particular touch sensations to the user 108. Continuing the example, a motor 132 with an eccentric weight may be used to create a buzz or vibration to allow the AMD 104 to simulate the purr of a cat.

Figure 4:
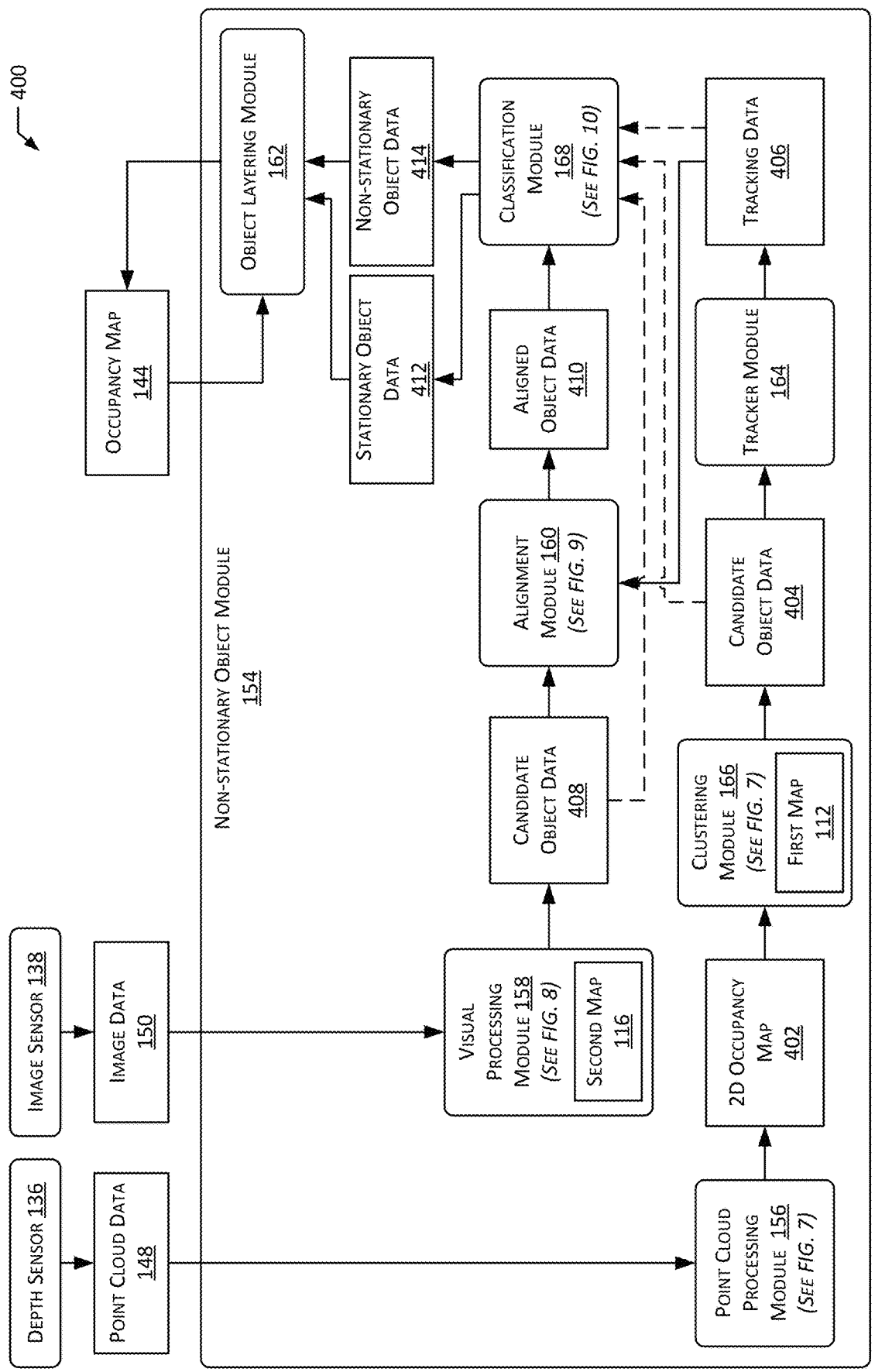
FIG. 4 is a block diagram of a non-stationary object module, according to some implementations.

FIG. 4 illustrates at 400 a block diagram of the non-stationary object module 154, according to some implementations.

The non-stationary object module 154 uses sensor data 146 to update the occupancy map 144. The occupancy map 144 may include a first layer indicative of stationary objects and a second layer indicative of non-stationary objects. The first layer may indicate stationary objects, such as sofas, chairs, tables, walls, and so forth. The second layer may indicate non-stationary objects, such as users 108, pets, or other autonomous mobile devices. The AMD 104 may use the first layer to determine path plans between different locations of a physical space 102. The AMD 104 may use the second layer to make navigation adjustments as the AMD 104 moves along the path plan, where the navigation adjustments are made to avoid interrupting or moving into the way of one or more non-stationary objects.

The depth sensor 136 may acquire point cloud data 148. The image sensor 138 may acquire image data 150. The non-stationary object module 154 uses the sensor data 148, 150 to classify an object representing a physical object within the physical space 102 as stationary or non-stationary. The non-stationary object module 154 may determine that an object is a stationary object based on one or more characteristics of the object, such as one or more of: a width value, a length value, an aspect ratio, a velocity, physical features of the object, and so forth.

The non-stationary object module 154 may update the second layer of the occupancy map 144 to include objects determined to be stationary objects. The non-stationary object module 154 may also update the occupancy map 144 by removing one or more objects from the second layer that are determined to be unoccupied based on the sensor data 146.

The non-stationary object module 154 may include: a point cloud processing module 156, a visual processing module 158, an alignment module 160, an object layering module 162, a tracker module 164, a clustering module 166, and a classification module 168. In one implementation, image data 150 from an image sensor 138, without use of depth sensor data such as point cloud data 148, may be used to determine a non-stationary object. For example, the visual processing module 158 may use image data 150 to determine a first candidate object represented by candidate object data 408. The candidate object data 408 may be used by the alignment module 160 to determine aligned object data 410. The classification module 168 may use the tracking data 406 to determine stationary object data 412 and non-stationary object data 414.

In another implementation, point cloud data 148 from a depth sensor 136, without use of image data 150, may be used to determine a non-stationary object. This may occur in situations where the image sensor 138 is inoperable, has been turned off, is not producing usable data due to over- or under-exposure, has a FOV 110 directed elsewhere, and so forth. For example, the point cloud processing module 156 may determine a 2D occupancy map 402. The clustering module 166 may use the 2D occupancy map 402 to determine a first candidate object represented by candidate object data 404. The tracker module 164 may use the candidate object data 404 to determine tracking data 406. The classification module 168 may use the object that is tracked and indicated by the tracking data 406 to determine stationary object data 412 and non-stationary object data 414. In this implementation, a confidence level of the output of the classification module 168 may be decreased. For example, the object may be determined to be a non-stationary object with a confidence value of 0.70.

In another implementation, described with respect to the system flow depicted in FIG. 4, both image data 150 and point cloud data 148 may be used to determine a non-stationary object. For example, the point cloud processing module 156 may receive point cloud data 148 acquired by the depth sensor 136. The point cloud processing module 156 may use the three-dimensional point cloud data 148 to determine a two-dimensional (2D) occupancy map 402 of the physical space 102. The 2D occupancy map 402 may include representations of one or more of: walls, furniture, plants, objects that may later be determined to be non-stationary objects, and so forth. The 2D occupancy map 402 may be represented by a grid of cells, where an individual cell may be representative of physical dimensions of the physical space 102, such as M×N centimeters. An individual cell may be considered "occupied" if sensor data 146 indicates that at least a portion of a physical object is located at a portion of the physical space 102 associated with the cell.

The clustering module 166 may use the 2D occupancy map 402 determined by the point cloud processing module 156 to determine candidate object data 404. The clustering module 166 may use the 2D occupancy map 402 to determine whether one or more occupied cells are representative of a candidate object that may be determined to be a non-stationary object. The clustering module 166 may filter out a detected object as a candidate object based on determining whether the one or more cells are arranged in a shape or size associated with an object that is not expected to move. For example, a sofa may have a length of P centimeters, a width of Q centimeters, and an aspect ratio of P:Q. The sofa may be filtered out as a candidate object based on having an aspect ratio that is greater than a first threshold aspect ratio. For example, a sofa may have an aspect ratio with respect to a length:width of 5:1, which is an improbable aspect ratio for a user 108. Similarly, walls or other large objects may be filtered out as candidate objects based on one or more of: a width value, a length value, a height value, or an aspect ratio. In this example, the candidate objects determined by the clustering module 166 are depicted within a first map 112. The candidate object data 404 determined by the clustering module 166 may be used by the tracker module 164 to determine whether the candidate objects may be objects that are tracked.

The tracker module 164 may use the candidate object data 404 determined by the clustering module 166 to determine tracking data 406. Tracking data 406 may be used by the classification module 168 to determine whether the object that is tracked is a non-stationary object or a stationary object. In some implementations, the tracker module 164 may be bypassed or eliminated, and a candidate object determined by the clustering module 166 may be used by the classification module 168 to determine whether the candidate object is a non-stationary object or a stationary object.

In this example, the tracker module 164 may determine whether a candidate object is an object that is tracked based on one or more of: a physical location, a velocity, size (e.g., bounding radius), an association between a particular candidate object and a previously tracked candidate object. The tracker module 164 may improve the likelihood that a candidate object determined by the clustering module 166 is determined to be a non-stationary object because the tracker module 164 may determine whether the candidate object has characteristics that indicate the candidate object is moving as a non-stationary object would move.

As a first example, at a first time, the tracker module 164 may receive first candidate object data determined by the clustering module 166. The first candidate object data may be indicative of a first size and first location within the physical space 102. At a second time, the tracker module 164 may receive second candidate object data determined by the clustering module 166. The second candidate object data may indicate a second size and a second location within the physical space 102. The tracker module 164 may determine that the second candidate object data is representative of the first candidate object in a second location based on the second size being equal or equivalent to the first size and on an estimated velocity of the second candidate object being within threshold values of a non-stationary object.

The threshold values may include a first threshold velocity indicative of a slow-walking velocity and second threshold velocity indicative of a fast-walking velocity. The tracker module 164 may determine a data association between the first candidate object data and the second candidate object data using a linear assignment algorithm, such as the Konig-Egervary Hungarian data association algorithm or a LAPJV (Jonker-Volgenant Algorithm for a Linear Assignment Problem) algorithm. The tracker module 164, based on the association between the first candidate object data and the second candidate object data, may determine that the first candidate object data and the second candidate object data are representative of a same physical object. Based on the first candidate object data and the second candidate object data being representative of the same physical object, the tracker module 164 may determine the second candidate object to be an object that is tracked, represented by tracking data 406.

As a second example, at a first time, the tracker module 164 may receive first candidate object data determined by the clustering module 166. The first candidate object data may be at a first location. At a second time, second candidate object data may be determined by the clustering module 166. The second candidate object data may be at a second location. Depending on a frequency at which the point cloud data 148 is determined, the first location and the second location may be near enough that one or more dimensions indicated by the first candidate object data overlap with one or more dimensions indicated by the second candidate object data. If a location indicated by the first candidate object data overlaps with a location indicated by the second candidate object data, the second candidate object may be determined to be the first candidate object after moving to the second location. In other examples, there may be one or more cells between the one or more dimensions indicated by the first candidate object data at the first location and one or more dimensions indicated by the second candidate object data at the second location. In this example, the first candidate object data may be associated with the second candidate object data based on one or more of: a first length indicated by the first candidate object data being within a first threshold of a second length indicated by the second candidate object data; a first width indicated by the first candidate object data being within a second threshold of a second width indicated by the second candidate object; a first aspect ratio indicated by the first candidate object data being equal to a second aspect ratio indicated by the second candidate object data; or a number of cells between one or more dimensions of the first object being less than or equal to a third threshold number of cells to one or more dimensions of the second object. Based on the association, the second candidate object may be determined to be an object that is tracked, represented by tracking data 406.

The tracking data 406 may then be used by the classification module 168 to determine whether the tracking data 406 is representative of a non-stationary object or a stationary object. Another input to the classification module 168 may be aligned object data 410 determined by the alignment module 160. The alignment module 160 may use candidate object data 408 determined by the visual processing module 158.

The visual processing module 158 may use image data 150 to determine candidate object data 408. For example, the visual processing module 158 may use feature detection algorithms to identify one or more objects within the physical space 102. For example, a facial recognition algorithm may determine that a user 108 is present within the physical space 102. Similarly, the visual processing module 158 may determine whether the image data 150 is representative of a pet or other living being. The visual processing module 158 may also determine a relative location of the candidate object within the physical space 102. In this example, the candidate object determined by the visual processing module 158 is depicted within a second map 116. In some implementations, the candidate object data 408 determined by the visual processing module 158 may then be used by the classification module 168 to determine whether the candidate object data 408 is non-stationary object data 414 or stationary object data 412. In other implementations, the candidate object data 408 determined by the visual processing module 158 may be used by an alignment module 160 to determine whether the candidate object data 408 is aligned with tracking data 406.

The alignment module 160 may use the candidate object data 408 determined by the visual processing module 158 and either tracking data 406 determined by the tracker module 164 or candidate object data 404 determined by the clustering module 166. A first object may be representative of candidate object data 408 determined by the visual processing module 158. A second object may be representative of tracking data 406 determined by the tracker module 164 or may be representative of candidate object data 404 determined by the clustering module 166. The alignment module 160 may determine that a first location of the first object is less than or equal to a threshold distance from a second location of the second object. The alignment module 160 may also determine that a first size of the first object is within a threshold percentage of a second size of the second object.

The alignment module 160 may determine that the first object is aligned with the second object based on the first location of the first object being less than or equal to the threshold distance from the second location of the second object and on the first size of the first object being within a threshold percentage of the second size of the second object. The alignment module 160 may determine an aligned object based on both the first object and on the second object. The first location may be associated with a first set of coordinates relative to the physical space 102, and the second location may be associated with a second set of coordinates relative to the physical space 102. In this example, the alignment module 160 may base a determination that the first object and the second object are indicative of a same object based on the first location of first object being less than or equal to the threshold distance from the second location of the second object. For example, the alignment module 160 may determine one or more characteristics of the aligned object based on one or more of: an average of a first width of the first object and a second width of the second object, an average of a first length of the first object and a second length of the second object, a velocity of the second object, or an average of corresponding coordinate values indicating a location of the first object and the second object within the physical space 102.

The classification module 168 may determine whether a particular object is a non-stationary object or a stationary object. A first object may be representative of aligned object data 410, tracking data 406, or candidate object data 408. Aligned object data 410 is determined by the alignment module 160 and may be indicative of one or more of a confidence value of alignment, the tracking data 406, or candidate object data 408. For example, the aligned object data 410 may indicate that the candidate object data 408 and the tracking data 406 have an alignment confidence value of 0.95, indicating high confidence. The classification module 168 may use one or more characteristics of the aligned object data 410, candidate object data 408, or tracking data 406 to determine whether the first object is a non-stationary object or a stationary object. The one or more characteristics may include one or more of: velocity of the first object, a change in velocity over time, a size of the first object, an aspect ratio of the first object, and so forth. If the first object is determined to be a stationary object, the first object is added to a first layer of the occupancy map 144. If the first object is determined to be a non-stationary object, the non-stationary object is added to a second layer of the occupancy map 144. The non-stationary objects and stationary objects determined by the classification module 168 may be used by the object layering module 162 to update one or more layers of the occupancy map 144.

The object layering module 162 may use the stationary object data 412 or non-stationary object data 414 to update one or more layers of the occupancy map 144. A first layer of the occupancy map 144 may indicate locations, size, and other characteristics of a stationary object. The first layer of the occupancy map 144 may be used for route planning and determining paths between locations in the physical space 102. A second layer of the occupancy map 144 may indicate locations, size, velocity, and other characteristics of a non-stationary object. The second layer of the occupancy map 144 may be used for local navigation determinations to avoid collisions or interrupting movement of non-stationary objects as the AMD 104 moves along a path plan. Because non-stationary objects in the second layer do not exclude path plans available in the first layer, the AMD 104 is able to determine path plans using an accurate representation of the stationary objects in the physical space 102.

For example, at a first time, the AMD 104 may determine a first path plan comprising instructions to navigate the AMD 104 from a first location in the physical space to a second location in the physical space. The AMD 104 may determine, based on a velocity associated with a non-stationary object and on a direction associated with the non-stationary object, an expected path of the non-stationary object. The AMD 104 may determine, based on the first path plan and the expected path, a potential collision between the AMD 104 moving in accordance with the first path plan and the non-stationary object moving in accordance with the expected path. The AMD 104 may determine, based on the potential collision, a second path plan comprising instructions to navigate the AMD 104 away from the non-stationary object. The AMD 104 may move based on the second path plan to avoid the potential collision.

Figure 5:
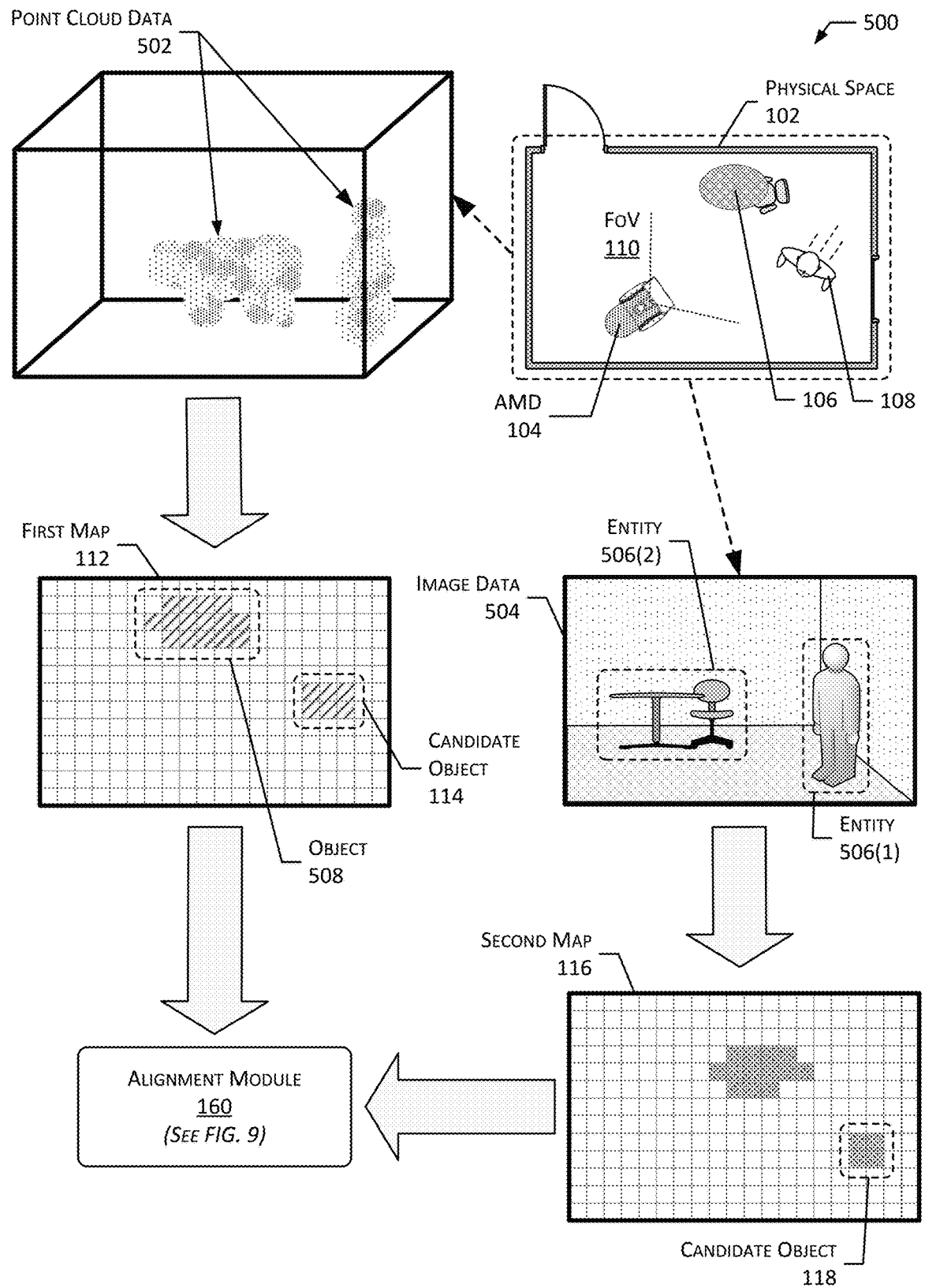
FIG. 5 illustrates an alignment module that aligns candidate objects determined using different sensors, according to some implementations.

FIG. 5 illustrates at 500 an alignment module 160 that aligns candidate objects 114, 118 determined using different sensors 134, according to some implementations.

The alignment module 160 is described above with respect to FIG. 4. As depicted in FIG. 5, sensor data 146 may comprise point cloud data 502 and image data 504. As depicted, the alignment module 160 uses the candidate object 114 determined using point cloud data 502 and the candidate object 118 determined using image data 504.

With respect to the point cloud data 502, one or more objects 508, 114 may be determined using the clustering module 166, as described with respect to FIG. 4. The clustering module 166 may use a 2D occupancy map 144 of the point cloud data 502 to determine whether one or more occupied cells are representative of a candidate object that may be determined to be a non-stationary object. The clustering module 166 may filter out a detected object as a candidate object based on determining whether the one or more cells are arranged in a shape or size associated with an object that is not expected to move. For example, a sofa may have a length of P centimeters, a width of Q centimeters, and an aspect ratio of P:Q. The sofa may be filtered out as a candidate object based on having an aspect ratio that is greater than a first threshold aspect ratio. For example, a sofa may have an aspect ratio with respect to a length:width of 5:1, which is an improbable aspect ratio for a user 108. Similarly, walls or other large objects may be filtered out as candidate objects based on one or more of: a width value, a length value, a height value, or an aspect ratio. In this example, the candidate object 114 determined by the clustering module 166 is depicted within the first map 112. The object 508 filtered out as not being a candidate object is depicted within the first map 112.

With respect to the image data 504, one or more entities 506 may be determined using object recognition algorithms. In this example, semantic data about the physical space 102 may be available. For example, a machine vision system may use the image data 504 to determine that the image data 504 includes a depiction of furniture and a person. The person is depicted by entity 506(1) and the furniture is depicted by entity 506(2), where entity 506(1) is associated with a semantic label of "person", and where entity 506(2) is associated with a semantic label of "furniture". Semantic labels for objects that may be non-stationary objects are determined to be candidate objects. For example, entity 506(1), associated with the label "person", is determined to be a candidate object 118 based on the semantic label "person" being associated with a first category of objects that may be non-stationary objects. Candidate object 118 is depicted with respect to the second map 116. Other semantic labels for the first category of objects that may move include "dog", "cat", "robot", and so forth. Based on the entity 506(2), associated with the label "furniture", not being among the first category of objects, entity 506(2) is not determined to be a candidate object.

In this example, the candidate object 114 and candidate object 118 are used by the alignment module 160 to determine aligned object data 410. The alignment module 160 is described in more detail with respect to FIG. 9.

Figure 6:
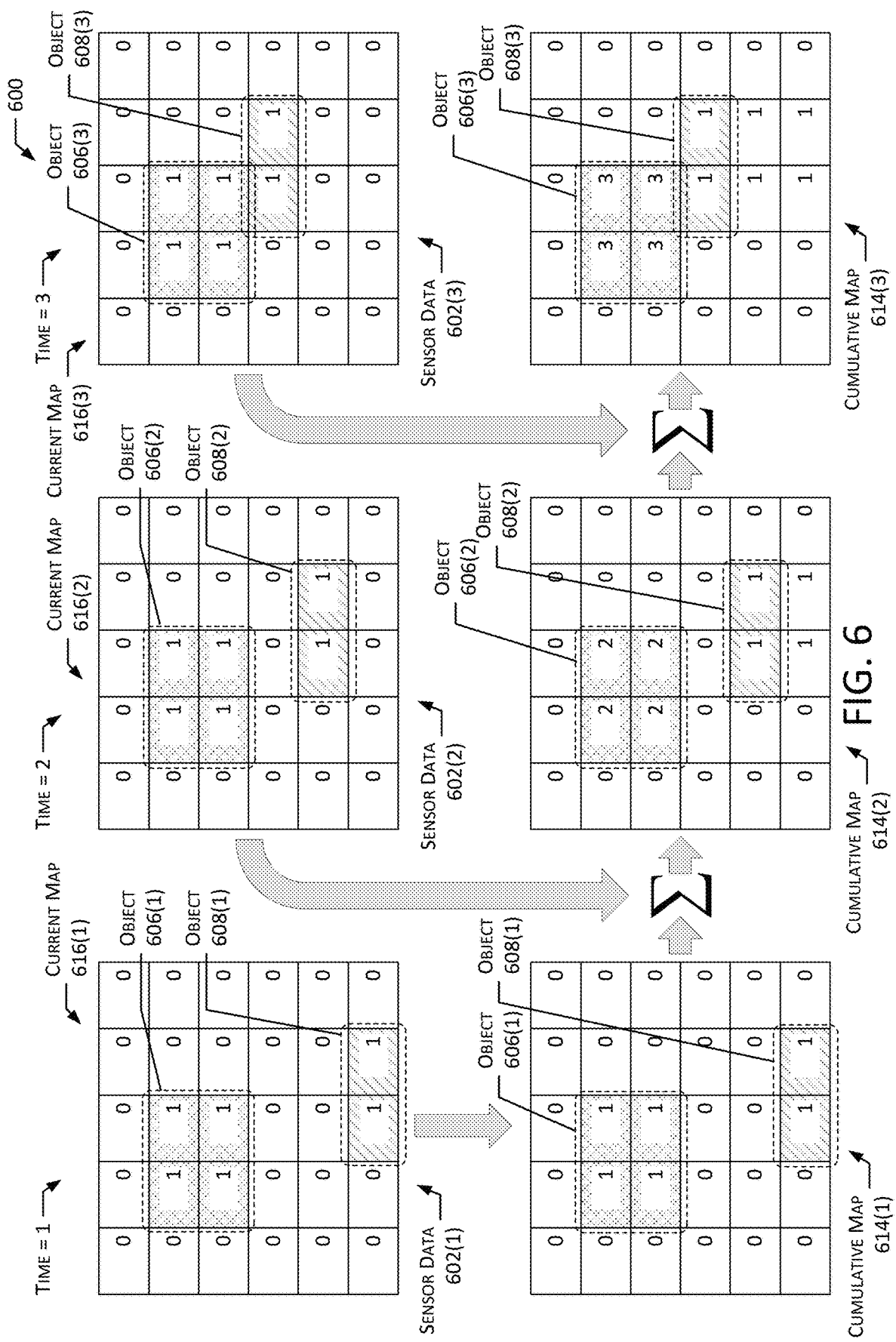
FIG. 6 illustrates a system for distinguishing stationary objects from adjacent non-stationary objects, according to some implementations.

FIG. 6 illustrates at 600 a system for distinguishing stationary objects from adjacent non-stationary objects, according to some implementations.

In this illustration, the non-stationary object module 154 may use a background subtraction algorithm to determine whether an individual cluster of sensor data 146 is indicative of a stationary object that is adjacent to a non-stationary object. Using the background subtraction algorithm, the non-stationary object module 154 may avoid misclassifying a stationary object as part of a non-stationary object. As described in the below example, a non-stationary object at a first location may move from a first location to a location that is near a stationary object. Using sensor data 146 acquired over time to determine values that indicate occupied and unoccupied locations, locations associated with stationary objects may be excluded from being a location that is associated with a non-stationary object.

The non-stationary object module 154 may determine a current map 616 comprising a plurality of cells and a cumulative map 614 comprising a plurality of cells. Each respective cell may be associated with a respective area or location of the physical space 102. For example, a single cell or multiple cells may be associated with a given location. Sensor data 146 may be used to determine one or more objects within a physical area, and an individual object at a given location may be indicated by one or more cells that are associated with the given location. The cumulative map 614 and the current map 616 may be indicative of a physical area corresponding to the occupancy map 144. The current map 616 is used to indicate, at a given time and based on sensor data 146 associated with the physical area, occupied and unoccupied locations within the physical area. In this example, the current map 616 is not updated over time with historical values indicating occupied or unoccupied locations. As noted earlier, a map may be implemented using any data structure that provides for storage and modification of data. For example, data indicated by a map may be managed by arrays, database records, lists, data objects, graphs, and so forth.

The cumulative map 614 is updated over time to indicate historical values indicating occupied and unoccupied locations. The historical values in the cumulative map 614 may be used to determine locations of stationary objects and non-stationary objects. The non-stationary object module 154 may determine, with respect to the object that is tracked over a first time period, a first one or more updates to the cumulative map 614. In this example, the first one or more updates are to multiple locations associated with the cumulative map 614. The non-stationary object module 154 may, with respect to the stationary object over the first time period, determine a second one or more updates to the cumulative map 614. The second one or more updates are to a single location associated with the cumulative map 614. The non-stationary object module 154 may determine, based on the first one or more updates and the second one or more updates, an occupancy map 144 comprising the stationary object. The non-stationary object module 154 may determine, based on the first one or more updates and the second one or more updates, a non-stationary map layer comprising non-stationary objects.

At a first time, time=1, with respect to a cumulative map 614(1) of the physical space 102, the non-stationary object module 154 may acquire sensor data 602(1) to determine the current map 616(1). The current map 616(1) may be indicative of a first location being occupied and a second location being unoccupied. The first location may be associated with a first object 608(1) and the second location may be associated with a second object 606(1) of a current map 616(1). The sensor data 602(1) may be point cloud data 148 determined by a depth sensor 136, image data 150 determined by an image sensor 138, or both point cloud data 148 and image data 150. At the first time, the cumulative map 614(1) is set to be equal to the current map 616(1). The current map 616(1) is based on sensor data 602(1). In this example, a value of "0" indicates an unoccupied location as indicated by the sensor data 602(1), and a value of "1" indicates an occupied location as indicated by the sensor data 602(1).

At a second time, time=2, the non-stationary object module 154 may acquire sensor data 602(2) indicative of the first object 608(2) and the second object 606(2) in the current map 616(2). At the second time, the cumulative map 614(2) may be set to a sum of respective cells of the current map 616(2). The current map 616(2) may be indicative of occupied and unoccupied locations based on sensor data 602(2). In this example, because the second object 606(2) has not moved, cells associated with the second object 606(2) are incremented. In this example, because the first object 608(2) has moved, cells associated with a new location are incremented. As depicted, at the second time, the values of cells associated with the first object 608(2), "1", are different than the values of cells associated with the second object 606(2), "2".

At a third time, time=3, the non-stationary object module 154 may acquire sensor data 602(3) indicative of the first object 608(3) and the second object 606(3) in the current map 616(3). At the third time, the cumulative map 614(3) may be set to a sum of respective cells of the current map 616(3). The current map 616(3) may be indicative of occupied and unoccupied locations based on sensor data 602(3). In this example, because the second object 606(3) has not moved, cells associated with the second object 606(3) are incremented. In this example, because the first object 608(3) has moved, cells associated with a new location are incremented. As depicted, at the third time, the values of cells associated with the first object 608(3), "1", are different than the values of cells associated with the second object 606(3), "3".

At the third time, while the cells associated with the first object 608(3) and the second object 606(3) are adjacent, the non-stationary object module 154 distinguishes these adjacent cells as distinct objects based on values in the cells associated with the first object 608(3) being different than values in the cells associated with the second object 606(3). In this example, at the third time, the first object 608 is associated with a location that excludes the location of the second object 606. For example, the values associated with the first object 608 are based on values indicating occupied and unoccupied locations over the first time, second time, and third time. Because the first object 608 has moved, the values associated with the multiple locations of the first object 608 have not accumulated. Similarly, the values associated with the location of the second object 606 are based on values indicting a single occupied location over the first time, second time, and third time. Because the second object 606 has not moved, the values associated with the location of the second object 606 have accumulated. Based on the values associated with the first object 608 being less than a threshold value, the location associated with the first object 608 may be determined to be occupied by a non-stationary object. Similarly, based on the values associated with the second object 606 being greater than the threshold value, the location associated with the second object 606 may be determined to be occupied by a stationary object. The location associated with the stationary object may be excluded from the location associated with the non-stationary object. The threshold value may be based on a number of generated current maps 616 used to determine the cumulative map 614. For example, occupied and unoccupied cells of the cumulative map 614 are incremented each time a current map 616 is determined based on sensor data 602. In this example, a location associated with a stationary object is associated with a cumulative value in the cumulative map 614 of a number of generated current maps 616, which is the value 3. In this illustration, the threshold value may be one less than a number of generated current maps 616, which is the value 2.

Figure 7:
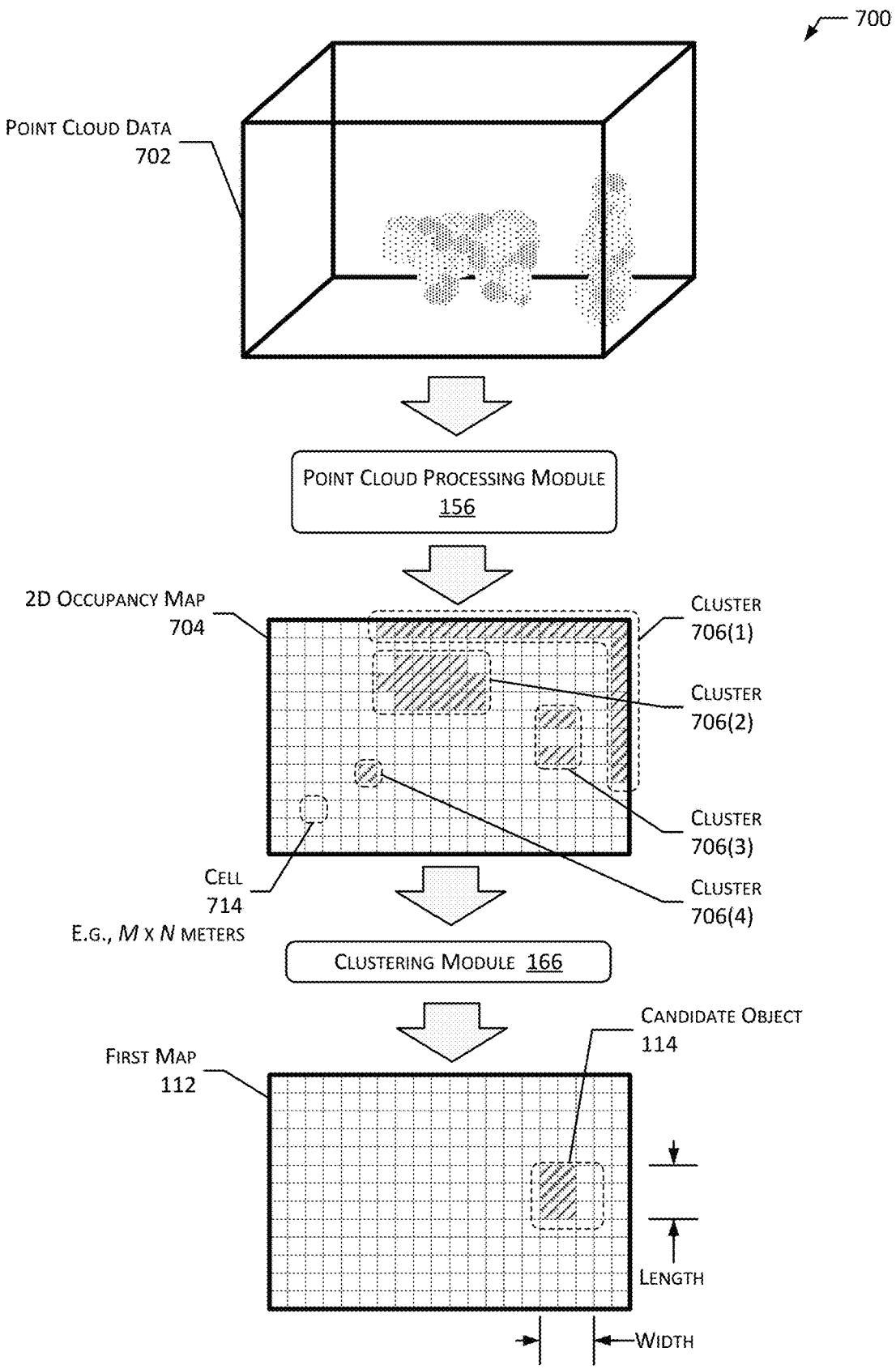
FIG. 7 illustrates a point cloud processing module and a clustering module to determine candidate objects, according to some implementations.

FIG. 7 illustrates at 700 a point cloud processing module 156 and a clustering module 166 to determine candidate objects 114, according to some implementations.

The point cloud processing module 156 may receive point cloud data 702 determined by the depth sensor 136. The point cloud processing module 156 may use the three-dimensional point cloud data 702 to determine a two-dimensional (2D) occupancy map 704 of the physical space 102. The 2D occupancy map 704 may include representations of one or more of: walls, furniture, non-stationary objects, and so forth. The 2D occupancy map 704 may be represented by a grid of cells, where an individual cell may be representative of physical dimensions of the physical space 102, such as M×N centimeters. An individual cell may be considered "occupied" if sensor data 146 indicates that at least a portion of a physical object is located at a portion of the physical space 102 associated with the cell. An example individual cell is depicted as cell 714.

In this example, the 2D occupancy map 704 includes clusters 706(1)-(4). Cluster 706(1) is representative of a wall within the physical space 102. Cluster 706(2) is representative of furniture within the physical space 102. Cluster 706(3) is representative of a person within the physical space 102. Cluster 706(4) may be determined to be noise based on occupying less than or equal to a threshold number of cells.

The clustering module 166 may use the 2D occupancy map 704 determined by the point cloud processing module 156 to determine one or more candidate clusters. The clustering module 166 may use the 2D occupancy map 704 to determine whether one or more occupied cells are representative of a candidate object that may be determined to be non-stationary. The clustering module 166 may filter out detected objects as candidate objects based on determining whether the one or more cells are arranged in a shape or size associated with an object expected to move. For example, a sofa may have a length of P centimeters, a width of Q centimeters, and an aspect ratio of P:Q. The sofa may be filtered out as a candidate object based on having an aspect ratio that is greater than a threshold aspect ratio value. Similarly, walls or other large objects may be filtered out as candidate objects. In this example, the candidate object 114 determined by the clustering module 166 is depicted within the first map 112. Based on the individual aspect ratios being greater than the threshold aspect ratio value, the clustering module 166 may filter out clusters 706(1) and 706(2). The clustering module 166 may determine the candidate object 114 be based on one or more individual occupied cells associated with the cluster 706(3) and on one or more unoccupied cells connecting the one or more individual occupied cells. The candidate object 114 determined by the clustering module 166 may then be used by the tracker module 164 to determine whether the candidate objects may be objects that are tracked.

Figure 8:
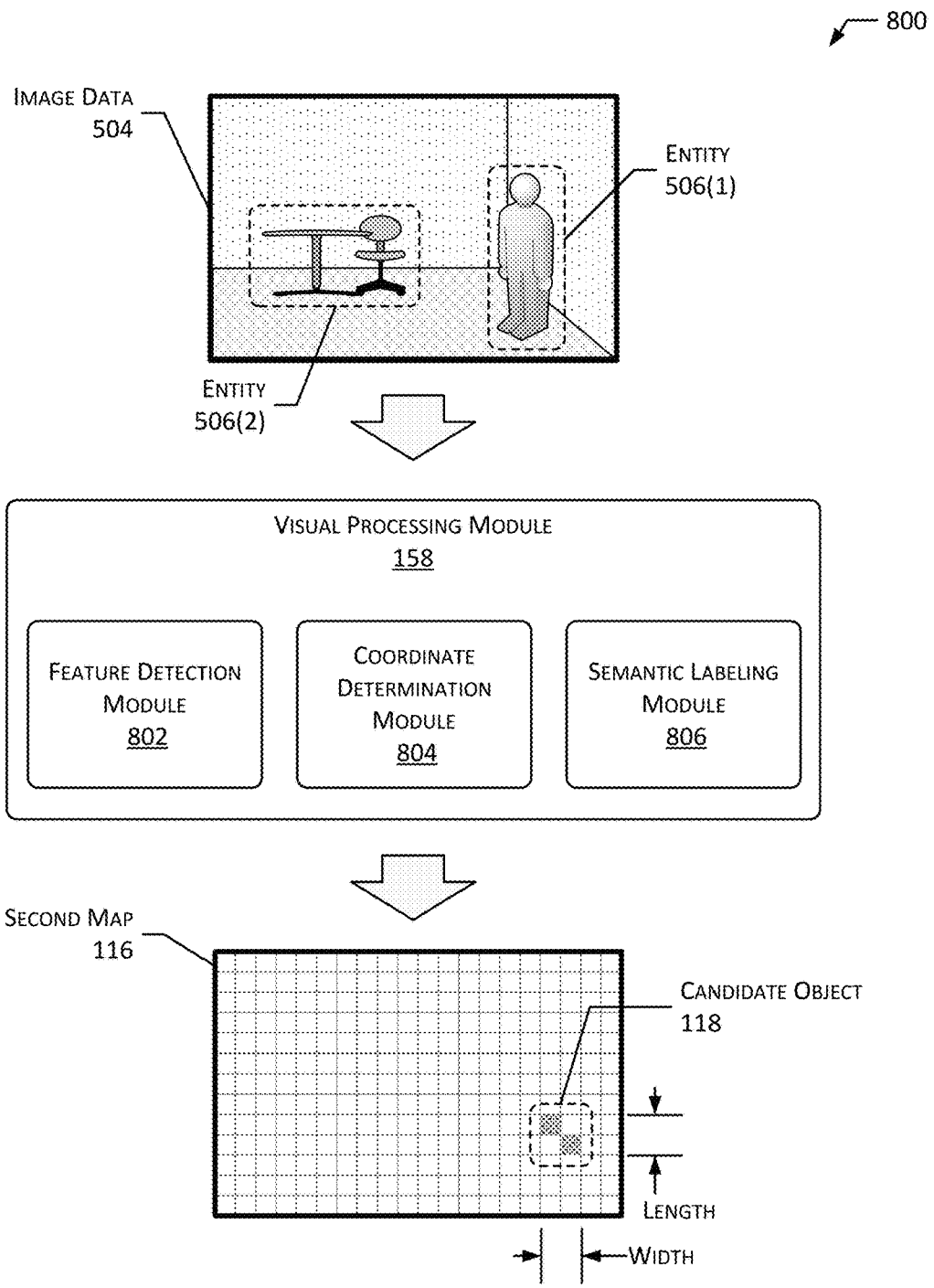
FIG. 8 illustrates a visual processing module to determine candidate objects, according to some implementations.

FIG. 8 illustrates at 800 a visual processing module 158 to determine candidate objects, according to some implementations.

With respect to the image data 504, one or more entities 506 may be determined using object recognition algorithms. In this example, semantic data about the physical space 102 may be available. For example, a machine vision system may use the image data 504 to determine that the image data 504 includes a depiction of furniture and a person. The person is depicted by entity 506(1) and the furniture is depicted by entity 506(2), where entity 506(1) is associated with a semantic label of "person", and where entity 506(2) is associated with a semantic label of "furniture".

A semantic labeling module 806 may determine semantic labels for objects that are deemed capable of changing location between a first time and a second time. Objects deemed capable of changing location between a first time and a second time are determined to be candidate objects. For example, entity 506(1), associated with label "person", is determined to be a candidate object 118 based on the semantic label "person" being associated with a first category of objects that may be a non-stationary object. Candidate object 118 is depicted with respect to the second map 116. Other semantic labels for the first category of objects that may move include "dog", "cat", "robot", and so forth. Based on the entity 506(2), associated with label "furniture", not being among the first category of objects, entity 506(2) is not determined to be a candidate object.

A feature detection module 802 may use feature detection algorithms to identify one or more objects within the physical space 102. For example, a facial recognition algorithm may determine that entity 506(1) represents a person. Similarly, the feature detection algorithm may determine whether an entity 506 represents a type of entity that matches one of the first category of objects that may move.

A coordinate determination module 804 may determine a location of the user 108 within the physical space 102. For example, an occupancy map 144 may include locations of fixed objects within the physical space 102. The AMD 104 may also determine a first direction and a first location within the physical space 102 where the image data 504 was determined. To determine a location of the entity 506(1), the AMD 104 may use one or more of: the first direction, a first location, the occupancy map 144, or relative locations of one or more stationary objects in the field-of-view at a time the image data 504 was acquired.

Figure 9:
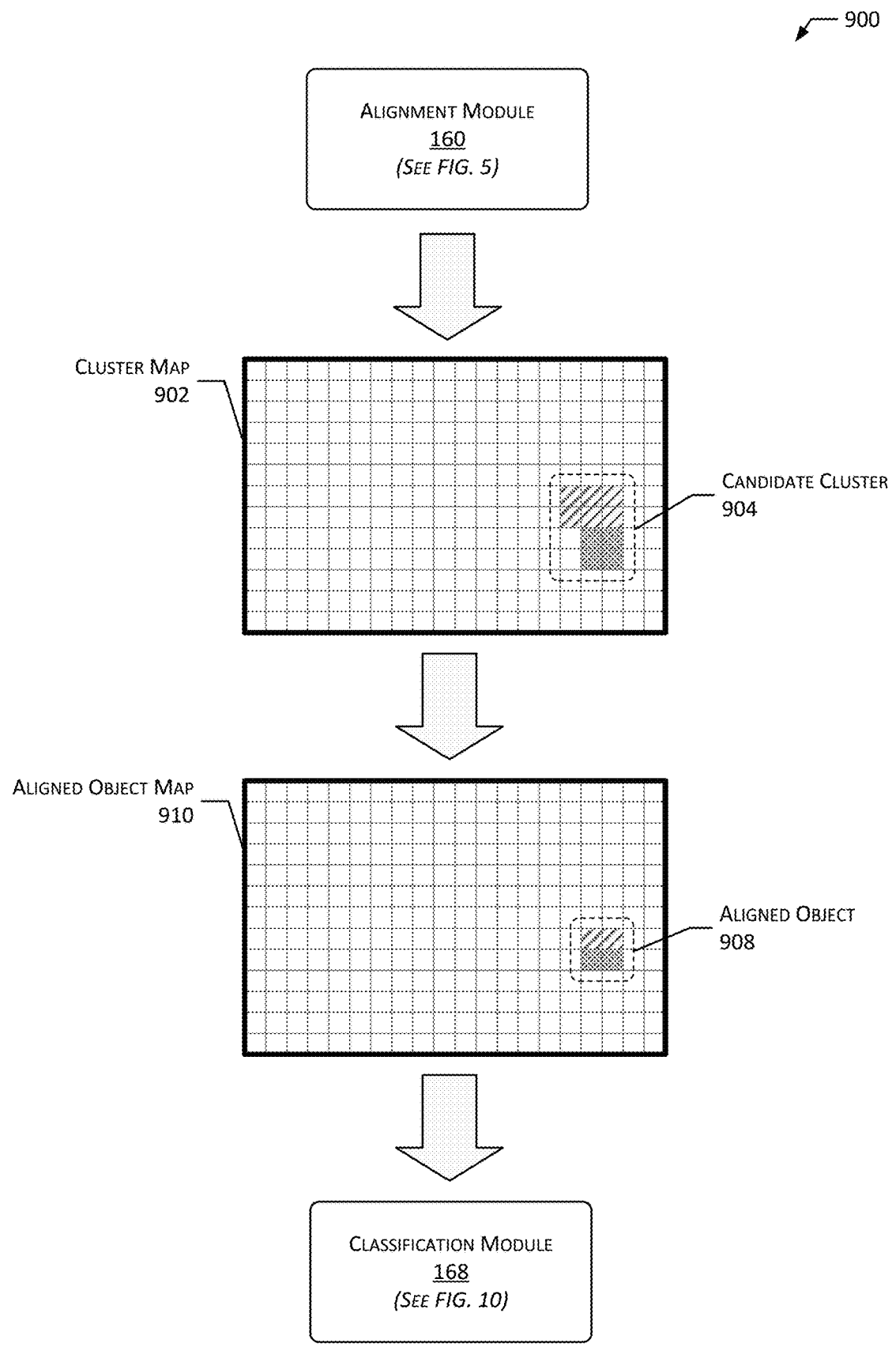
FIG. 9 illustrates an alignment module and a classification module to determine whether candidate objects are aligned objects, according to some implementations.

FIG. 9 illustrates at 900 an alignment module 160 and a classification module 168 to determine whether candidate objects are aligned objects, according to some implementations.

The alignment module 160 may use candidate objects determined by the visual processing module 158 and either objects that are tracked determined by the tracker module 164 or candidate objects determined by the clustering module 166. For example, candidate object data 408 based on point cloud data 148 and based on image data 150 is described with respect to FIG. 5. A first object may be a candidate object 118 determined by the visual processing module 158. A second object may be an object that is tracked determined by the tracker module 164 or may be a candidate object 114 determined by the clustering module 166. The alignment module 160 may determine that a first location of the first object is less than or equal to a threshold distance from a second location of the second object. The first location may be indicated by one or more cells of the first map 112. The second location may be indicated by one or more cells of the second map 116. The alignment module 160 may also determine that a first size of the first object is within a threshold percentage of a second size of the second object. A first size may be determined by a first quantity of cells occupied by the candidate object 114. A second size may be determined by a second quantity of cells occupied by the candidate object 118.

The alignment module 160 may determine that the first object is aligned with the second object based on the first location of the first object being less than or equal to the threshold distance from the second location of the second object and on the first size of the first object being within a threshold percentage of the second size of the second object. The alignment module 160 may determine a candidate cluster 904 based on the first quantity of cells and on the second quantity of cells. In this example, a cluster map 902 depicts the candidate cluster 904 as a group of cells that includes the first quantity of cells and the second quantity of cells.

The alignment module 160 may determine that the first object is aligned with the second object based on overlap within the physical space 102. For example, if the first object and the second object both are associated with occupying greater than a threshold area in common within the physical space 102, they may be deemed to be aligned.

The alignment module 160 may determine an aligned object 908 based on one or more characteristics of the candidate objects used to determine the candidate cluster 904. For example, the alignment module 160 may determine one or more characteristics of the aligned object 908 based on one or more of: an average of a first width of the first object and a second width of the second object, an average of a first length of the first object and a second length of the second object, a velocity of the second object, or an average of corresponding coordinate values indicating a location of the first object and the second object within the physical space 102. The aligned object 908 is depicted with respect to the aligned object map 910.

Figure 10:
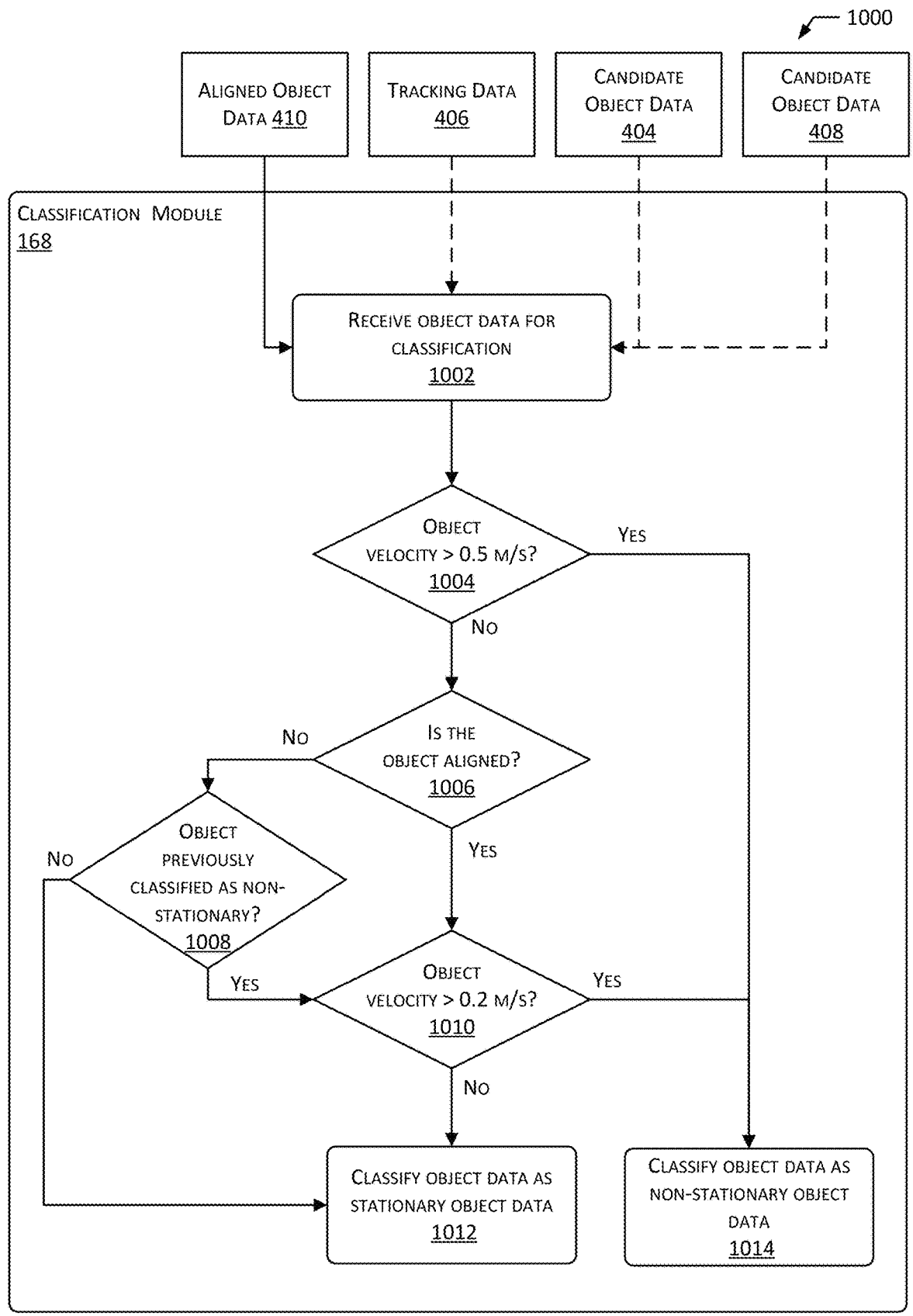
FIG. 10 is a flow diagram of a process for classifying an aligned object or an object that is tracked as a stationary object or a non-stationary object, according to some implementations.

FIG. 10 is a flow diagram 1000 of a process for classifying an aligned object or an object that is tracked as a stationary object or a non-stationary object, according to some implementations.

At 1002, the classification module 168 may receive particular object data for classification. As described above with respect to FIG. 4, the particular object data may be one or more of the aligned object data 410, the tracking data 406, the candidate object data 404, or the candidate object data 408. For example, the aligned object data 410 may be provided to the classification module 168. In another example, the candidate object data 404 and the candidate object data 408 may be provided to the classification module 168. In yet another example, the candidate object data 408 and the tracking data 406 may be provided to the classification module 168. Other combinations of input data to the classification module 168 may also be used.

Aligned object data 410 is determined by the alignment module 160. The tracking data 406 may be determined by the tracker module 164. Candidate object data 404 and candidate object data 408 may be determined by either the visual processing module 158 or the clustering module 166.

At 1004, the classification module 168 may determine whether the particular object data is representative of a physical object moving at a velocity greater than 0.5 meters/second (m/s). In this example, a first threshold velocity for determining whether the particular object data is indicative of a non-stationary object is 0.5 m/s, but in other examples, the first threshold velocity may be specified to be another velocity value. If the particular object data is indicative of a velocity greater than the first threshold velocity, then the process continues at 1014, where the particular object data is classified to be representative of a non-stationary object. If the particular object data is indicative of a velocity less than or equal to the first threshold velocity, then the process continues at 1006.

In some examples, the classification module 168 may determine whether the particular object data is indicative of a non-stationary object based on audio data. Audio data may be used to determine a location of a physical object associated with the particular object data. For example, the AMD 104 may use a microphone array to acquire audio data and determine that the audio data is representative of a wakeword. The AMD 104 may determine, based on the audio data, a first direction value indicative of a direction relative to the AMD. The first direction value is in the direction, relative to the AMD, that the wakeword was uttered. The AMD 104 may determine, based on a first set of coordinates or a second set of coordinates, a second direction value indicative of a direction relative to the AMD. The first set of coordinates may be based on a location of a physical object associated with the particular object data determined by the point cloud processing module 156. The second set of coordinates may be based on a location of a physical object associated with candidate object data determined by the visual processing module 158. If the difference between the first direction value and the second direction value is less than or equal to a threshold value, then the particular object data may be classified to be representative of a non-stationary object.

At 1006, the classification module 168 may determine whether the particular object data is aligned object data. For example, aligned object data 410 received from the alignment module 160 may indicate that the aligned object data 410 has been aligned. An aligned object 908 may be deemed to be aligned if the confidence value of alignment between the tracking data 406 and the candidate object data 408 is greater than a threshold value. For example, the confidence value may be high if the candidate object 114 and the candidate object 118 are within a threshold distance of one another, overlap one another in the physical space 102, and so forth. If the particular object data has been aligned but is indicative of an object velocity less than or equal to the first threshold velocity, then a second threshold velocity is used to determine whether the particular object data is representative of a non-stationary object. The second threshold velocity is lower than the first threshold velocity. If the particular object data has been aligned, then the process continues at 1010. If the particular object data has not been aligned, then the process continues at 1008.

At 1008, the classification module 168 may determine whether the particular object data has previously been classified as representative of a non-stationary object. For example, the particular object data may indicate a previous classification as representing a non-stationary object. For example, over time, sensor data may be acquired and used to determine that previously determined object data is representative of an object that has moved within the physical space 102. If the particular object data has been previously classified as representative of a non-stationary object, then a second threshold velocity to determine whether the particular object data is representative of a non-stationary object is lower than the first threshold velocity. If the particular object data has been previously classified as representative of a non-stationary object, then the process continues at 1010. If the particular object data has not been previously classified as representative of a non-stationary object, then the process continues at 1012.

At 1010, the classification module may determine whether the particular object data is representative of a physical object moving at a velocity greater than 0.2 m/s. As described above with respect to 1004, the second threshold of 0.2 m/s may be specified differently in other examples. If the particular object data is representative of a physical object moving at a velocity greater than the second threshold velocity, then the process continues at 1014, where the classification module 168 classifies the particular object data as representative of a non-stationary object. If the particular object data is representative of a physical object moving at a velocity less than or equal to the second threshold velocity, then the process continues at 1012, where the classification module 168 classifies the particular object data as representative of a stationary object.

At 1012, the classification module 168 may classify the particular object data as stationary object data. For example, the classification module 168 may classify the particular object data as stationary object data 412, as depicted in FIG. 4. The object layering module 162 may use the stationary object data 412 to determine an update to an occupancy map 144. For example, the update may be indicative of a new location for a stationary object represented in the occupancy map 144. In another example, the update may be indicative of a new stationary object. By using an accurate occupancy map 144, the AMD 104 may accurately determine path plans between locations of the physical space 102.

At 1014, the classification module 168 may classify the particular object data as non-stationary object data. For example, the classification module 168 may classify the particular object data as non-stationary object data 414, as depicted in FIG. 4. The object layering module 162 may use the non-stationary object data 414 to determine an update to a non-stationary map layer 120. For example, the update may be indicative of a new location for a non-stationary object represented in the non-stationary map layer 120. In another example, the update may be indicative of a new non-stationary object. By using an accurate map of non-stationary objects, the AMD 104 may use information about the non-stationary objects to make navigation decisions that avoid interfering with the non-stationary objects as the AMD 104 moves in accordance with a path plan.

The classification module 168 may utilize one or more of a support vector machine (SVM), a classifier, a neural network, and so forth. For example, a classifier may be trained to determine whether the object is a non-stationary or a stationary object. In another example, a neural network may be trained to determine whether an object is sufficiently aligned.

In some implementations one or more machine learning techniques may be used to determine one or more threshold values. For example, a machine learning system, such as a neural network or classifier, may be trained and information about the first threshold velocity, the second threshold velocity, and so forth may be determined by the machine learning system. These determined thresholds may then be used as described with regard to FIG. 10.

The processes and methods discussed in this disclosure may be implemented in hardware, software, or a combination thereof. In the context of software, the described operations represent computer-executable instructions stored on one or more computer-readable storage media that, when executed by one or more hardware processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

Embodiments may be provided as a software program or computer program product including a non-transitory computer-readable storage medium having stored thereon instructions (in compressed or uncompressed form) that may be used to program a computer (or other electronic device) to perform processes or methods described herein. The computer-readable storage medium may be one or more of an electronic storage medium, a magnetic storage medium, an optical storage medium, a quantum storage medium, and so forth. For example, the computer-readable storage medium may include, but is not limited to, hard drives, optical disks, read-only memories (ROMs), random access memories (RAMS), erasable programmable ROMs (EPROMs), electrically erasable programmable ROMs (EEPROMs), flash memory, magnetic or optical cards, solid-state memory devices, or other types of physical media suitable for storing electronic instructions. Further embodiments may also be provided as a computer program product including a transitory machine-readable signal (in compressed or uncompressed form). Examples of transitory machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Thus, although certain steps have been described as being performed by certain devices, software programs, processes, or entities, this need not be the case, and a variety of alternative implementations will be understood by those having ordinary skill in the art.

Additionally, those having ordinary skill in the art will readily recognize that the techniques described above can be utilized in a variety of devices, physical spaces, and situations. Although the subject matter has been described in language specific to structural features or methodological acts, it is to be understood that the subject matter defined in the appended claims is not necessarily limited to the specific features or acts described. Rather, the specific features and acts are disclosed as illustrative forms of implementing the claims.

What is claimed is:

1. An autonomous mobile device (AMD) located in a physical space, the AMD comprising:
   a depth sensor;
   an image sensor;

one or more memories storing computer-executable instructions; and one or more processors to execute the computer-executable instructions to:

determine, using the depth sensor, point cloud data indicative of one or more objects within the physical space;

determine, based on the point cloud data, first object data indicative of a first location of a first object of the one or more objects, the first location being associated with a first set of coordinates;

acquire, using the image sensor, image data of a portion of the physical space;

determine, based on the image data, second object data indicative of a second object disposed at a second location in the physical space, the second location being associated with a second set of coordinates;

determine, using the first set of coordinates and the second set of coordinates, that the first object and the second object are indicative of a same object;

determine that the same object is moving at a first velocity that is greater than a threshold velocity; and determine that the same object is non-stationary based at least on the same object moving at the first velocity that is greater than the threshold velocity.

2. The AMD of claim 1, wherein the one or more processors further execute the computer-executable instructions to:

determine, based at least on the first object data, a navigation path within the physical space that avoids an intersection with the same object.

3. The AMD of claim 1, wherein to determine that the same object is non-stationary, the one or more processors further execute the computer-executable instructions to:

determine, based on the point cloud data, a cluster associated with the first object; and determine that an aspect ratio of the cluster is less than a threshold aspect ratio value.

4. The AMD of claim 1, wherein the point cloud data comprises a first set of coordinate points associated with the first object, and the one or more processors further execute the computer-executable instructions to:

determine, based on the first set of coordinate points, that a height value associated with the first object is between a first threshold height and a second threshold height; and determine, further based on the height value, the first object data.

5. The AMD of claim 1, wherein the point cloud data comprises a first set of coordinate points associated with the first object, and the one or more processors further execute the computer-executable instructions to:

determine, based on the first set of coordinate points, one or more characteristics comprising one or more of:

a length of the first object is greater than a threshold length value, a width of the first object is greater than a threshold width value, or an aspect ratio based on the length and the width is less than a threshold aspect ratio value; and determine, further based on the one or more characteristics, the first object data.

6. The AMD of claim 1, wherein the one or more processors execute the computer-executable instructions to:

determine, by the AMD at a first time, a first path to navigate from a third location in the physical space to a fourth location in the physical space;

determine, based on a second velocity and a direction of motion of the same object, an expected travel path of the same object;

determine an intersection point between the first path and the expected travel path, the intersection point indicative of a potential collision between the AMD and the same object;

determine a second path for the AMD, wherein the second path avoids the potential collision; and move the AMD along the second path.

7. The AMD of claim 1, wherein to determine that the same object is non-stationary, the one or more processors further execute the computer-executable instructions to:

determine one or more of:

an aspect ratio of the same object is less than a first threshold value, a length of the same object is greater than a second threshold value, or a width of the same object is greater than a third threshold value.

8. The AMD of claim 1, wherein to determine the first object data is indicative of the first location of the first object, the one or more processors further execute the computer-executable instructions to:

determine, at a first time, a first path of a third object, wherein the third object is associated with a second velocity;

determine, based on the first path and on the second velocity, a third location indicative of a projected location of the third object at a second time;

determine that the first time is within a threshold time of the second time;

determine that a first distance between the first location and the third location is less than or equal to a threshold distance; and determine, further based on the first distance being less than or equal to the threshold distance and on the first time being within the threshold time of the second time, the first object data.

9. The AMD of claim 1, wherein the one or more processors further execute the computer-executable instructions to:

determine, based on the image data, that the second object comprises one or more of: a human, a pet, or a second autonomous mobile device;

determine a confidence value that is indicative of a likelihood that the second object is non-stationary;

determine that the confidence value is greater than a first threshold; and determine, further based on the confidence value being greater than the first threshold, that the same object is non-stationary.

10. The AMD of claim 1, further comprising a microphone array, and the one or more processors further execute the computer-executable instructions to:

acquire audio data using the microphone array;

determine that the audio data is representative of a wakeword;

determine, based on the audio data, a first direction value indicative of a direction of a source of the audio data relative to the AMD;

determine, based on the first set of coordinates, a second direction value indicative of a direction of the same object relative to the AMD;

determine that a difference between the first direction value and the second direction value is less than or equal to a threshold value;

determine that the same object is the source of the audio data; and determine, further based on the same object being the source of the audio data, that the same object is non-stationary.

11. A method comprising:

determining, based on point cloud data acquired by one or more sensors on an autonomous mobile device (AMD), one or more objects in a physical space;

determining, based on the point cloud data, first object data indicative of a first object at a first location within the physical space;

determining, based on image data acquired by the one or more sensors on the AMD, second object data indicative of a second object at a second location within the physical space;

determining, based on the first location and the second location, that the first object and the second object are indicative of a same object;

determining that the same object is moving at a first velocity that is greater than a threshold velocity; and determining that the same object is non-stationary based at least on the same object moving at the first velocity that is greater than the threshold velocity.

12. The method of claim 11, further comprising:

determining, based on the point cloud data, a cluster associated with the first object;

determining, based on the cluster, that a height value associated with the first object is between a first threshold height and a second threshold height; and wherein the determining the first object data is further based on the height value.

13. The method of claim 11, further comprising:

determining, based on the point cloud data, a cluster associated with the first object;

determining, based on the cluster, one or more characteristics comprising one or more of:

a length of the first object is greater than a threshold length value, a width of the first object is greater than a threshold width value, or an aspect ratio based on the length and width is less than a threshold aspect ratio value; and wherein the determining the first object data is further based on one or more of: the length, the width, or the aspect ratio.

14. The method of claim 11, further comprising:

determining, by the AMD at a first time, a first path to navigate from a third location in the physical space to a fourth location in the physical space;

determining, based on a second velocity and a direction of motion of the same object, an expected travel path of the same object;

determining an intersection point between the first path and the expected travel path, the intersection point indicative of a potential collision between the AMD and the same object;

determining, based on the intersection point, a second path for the AMD, wherein the second path avoids the potential collision; and moving the AMD along the second path.

15. The method of claim 11, wherein the determining that the same object is non-stationary is further based on:

determining one or more of:

an aspect ratio of the same object is less than a first threshold value, a length of the same object is greater than a second threshold value, or a width of the same object is greater than a third threshold value.

16. The method of claim 11, wherein the determining the first object data is indicative of the first object further comprises:

determining, at a first time, the first location of the first object;

determining, at the first time, a first path of a third object, wherein the third object is associated with a second velocity;

determining, based on the first path and on the second velocity, a third location indicative of a projected location of the third object at a second time;

determining that the first time is within a threshold time of the second time;

determining a first distance between the first location and the third location is less than or equal to a threshold distance; and wherein the determining the first object data is further based on the first distance being less than or equal to the threshold distance and on the first time being within the threshold time of the second time.

17. A system comprising:

one or more memories storing computer-executable instructions; and one or more processors to execute the computer-executable instructions to:

determine, based on point cloud data acquired by a depth sensor, a first map indicative of one or more objects in a physical space;

determine, based on the first map, a first cluster representative of a first object of the one or more objects indicated by the first map;

determine, based on the point cloud data, one or more characteristics of the first cluster;

determine, based at least on the one or more characteristics of the first cluster, that the first object is expected to move;

determine, based on image data acquired by an image sensor, object data indicative of a second object within the physical space;

determine that the first object and the second object are the same object;

determine that the same object is moving at a first velocity that is greater than a threshold velocity; and determine that the same object is non-stationary based on the same object moving at the first velocity that is greater than the threshold velocity.

18. The system of claim 17, wherein the one or more processors further execute the computer-executable instructions to:

acquire the image data;

determine a confidence value that is indicative of a likelihood that the second object is non-stationary;

determine that the confidence value is greater than a first threshold value; and determine, further based on the confidence value being greater than the first threshold value, that the second object is expected to move.

19. The system of claim 17, wherein to determine that the first object is expected to move, the one or more processors further execute the computer-executable instructions to:

determine that an aspect ratio of the first cluster is less than a threshold aspect ratio value.

20. The system of claim 17, wherein the first object is associated with a first location, and wherein to determine that the first object is expected to move, the one or more processors further execute the computer-executable instructions to:
- determine, at a first time, a first path of a third object, wherein the third object is associated with a second velocity;
- determine, based on the first path and on the second velocity, a second location indicative of a projected location of the third object at a second time;
- determine that the first time is within a threshold time of the second time; and
- determine a first distance between the first location and the second location is less than or equal to a threshold distance;
- wherein to determine that the first object is expected to move is further based on the first distance being less than or equal to the threshold distance and on the first time being within the threshold time of the second time.

\* \* \* \* \*